United States Patent [19]

Järvik et al.

[11] Patent Number: 5,375,053
[45] Date of Patent: Dec. 20, 1994

[54] CONTROLLED POWER SUPPLY

[75] Inventors: Jaan Järvik; Kuno Janson, both of Tallinn, Estonia

[73] Assignee: MAN Gutehoffnungshütte AG, Oberhausen, Germany

[21] Appl. No.: 117,070

[22] PCT Filed: Jan. 8, 1993

[86] PCT No.: PCT/EP93/00023
§ 371 Date: Oct. 8, 1993
§ 102(e) Date: Oct. 8, 1993

[87] PCT Pub. No.: WO93/14557
PCT Pub. Date: Jul. 22, 1993

[30] Foreign Application Priority Data
Jan. 9, 1992 [DE] Germany .............................. 4200329

[51] Int. Cl.$^5$ .............................................. H02M 7/06
[52] U.S. Cl. .................................................... 363/126
[58] Field of Search ................ 363/36, 37, 123, 125, 363/126; 323/215; 315/205, 206, 208

[56] References Cited
U.S. PATENT DOCUMENTS

| | | | |
|---|---|---|---|
| 2,261,699 | 11/1941 | Rampacher | 363/126 |
| 4,187,449 | 2/1980 | Knoble | 315/205 |
| 4,316,125 | 2/1982 | Noguchi | 363/86 |
| 4,730,243 | 3/1988 | Glennon | 363/126 |
| 4,807,106 | 2/1989 | Baker et al. | 363/126 |
| 4,876,634 | 10/1989 | Paice | 363/126 |
| 5,200,887 | 4/1993 | Ioroi et al. | 363/126 |

FOREIGN PATENT DOCUMENTS 0197330 10/1986 European Pat. Off. ............. 363/126
1073619 1/1960 Germany .............................. 363/126

Primary Examiner—Steven L. Stephan
Assistant Examiner—Matthew Nguyen
Attorney, Agent, or Firm—Max Fogiel

[57] ABSTRACT

A controlled power supply in which an electric arc is used as a loading element. A single phase ac-to-dc invertor is provided with a matching transformer and a main rectifier and diodes which form the bridge and are connected to the matching transformer. The invertor has a controllable output. The bridge has a diagonal corresponding to an output of the rectifier and electrodes between which an electric arc can be initiated. a circuit for controlling the voltage across the electrodes includes a comparator to compare an actual rectified voltage with a reference value. The comparator provides for changing positions of the electrodes relative to each other. The single-phase ac-to-dc invertor is provided with two phase-shifting circuits that are connected in series and to the matching transformer. One of these phase-shifting circuits is a choke, whereas the other phase-shifting circuit is a capacitor. Each phase-shifting circuit is connected to a corresponding input of the main rectifier. The phase-shifting circuits are connected to an output of the main rectifier in the same polarity with diodes of the main rectifier connected to the electrodes.

16 Claims, 23 Drawing Sheets

CONTROLLED POWER SUPPLY

BACKGROUND OF THE INVENTION

The invention relates to electric-discharge heating systems and, more particularly, the invention relates to controlled power supplies.

The invention can be used in electric arc furnaces, in welding equipment, as well as in other similar devices, in which use is made of a short-circuit operating mode.

Known in the art are two ways of building up the electric circuit of electric arc furnaces. According to one way, the supply source is based on an uncontrolled or controlled reactor connected in series with a primary winding of a control transformer. The secondary winding of this transformer is connected to a diode rectifier which, in turn, is connected to the furnace electrodes.

The systems based on a diode rectifier with a non-controlled reactor has a low power factor and causes significant voltage fluctuation in the supply network.

The electrode position regulators are designed for maintaining an electric arc of the same length, and a large number of transformer steps are used for controlling the power during the process.

In order to eliminate the negative effect on the other consumers in networks of low and medium power range, dynamic compensators of reactive power are used. This increases the weight and overall dimensions of the power supply as a whole.

Known in the art is an ac-to-dc inverter with an uncontrolled rectifier connected in a bridge circuit comprising a matching transformer whose secondary winding has a tap connected directly to one input of the rectifier bridge, while the end and beginning of the secondary winding are connected to the remaining inputs of the rectifier bridge through a capacitor and a choke respectively. This inverter was proposed for supply of an electric arc and makes it possible to enhance the power factor and reduce the supply network voltage fluctuation. However, the use of this inverter with the known devices to control the position of the electrode for arc sources, in which there is no controlled elements (for example, for electric arc furnaces with a diode rectifier or for furnaces operating with alternating current) needs a switch and a transformer with a large number of control steps. This reduces the operational reliability of the power supply, deteriorates its weight and size and, while continuous control of output power, which is very important for efficient run of the process, is not provided.

Furthermore, higher current harmonics appearing during the rectification do not allow this inverter to be used in the low-power networks. This inverter can hardly be used in high-power furnaces and those with a low arc voltage.

The use of a circuit with a controlled reactor makes it possible to reduce the number of control steps of the transformer, because the inductive reactance of the reactor can be controlled. However, this is attained by complicating the reactor design and using a complex system to control the reactor. The remagnetization of the reactor rods in this system need relatively long time so that the compensation of fast current variation of the electric arc furnace is insufficient, and the voltage fluctuation in the network cannot be adequately reduced. In addition, such a power supply has a low power factor and a high level of the higher harmonics of the consumed current.

Therefore, the above-mentioned technical solutions have not found wide practical application.

Known in the art is a controlled power supply for an electric arc furnace based on a thyristor rectifier.

The power supply comprises a controlled ac-to-dc inverter and a device for controlling the furnace arc. The inverter has a step-by-step controlled transformer whose secondary winding is connected to a thyristor bridge which supplies dc current to the furnace electrodes through a high-power smoothing choke.

The device for controlling the arc current has a circuit to control the arc current with current regulator whose input is fed with a difference between a preset reference value and the measured actual value of the dc arc current. The output signal of the current regulator is summed up with the measured actual value of the arc voltage, which is used as a preset current value and applied to the thyristor rectifier. The arc control device also has a voltage control circuit with a unit to control the electrode position to set a gap between the electrode and the smelting bath, and a voltage regulator whose input is fed with a difference of the preset value of the arc voltage and the measured value. The output signal of the voltage regulator is applied to the input of the device to control the electrode position. The circuits to control the current and voltage and a pulse shaper to send control pulses to the thyristors form a complex control system in the power supply. Such a power supply, as a whole, is complicated due to the presence of a special system to control the thyristors, features a heavy weight and large dimensions, as well as high installed power of the power supply equipment.

The power supply equipped with a thyristor rectifier allows one to continuously control the rectifier current what is necessary, on the one hand, for controlling the arc power to meet the technological requirements and, on the other hand, to limit the arc current fluctuation including the operating short-circuit current. However, owing to slow response, the thyristor rectifier cannot change the input voltage following the fast variations of the arc voltage so that a high-power smoothing choke is needed.

In order to avoid frequent arc breaks, the rated arc voltage must be by at least 20–25% lower the no-load voltage of the controlled rectifier. This fact leads to a corresponding increase of the installed power of the transformer and a decrease of the nominal power factor to 0.7–0.8.

The thyristor rectifier distorts the form of the current consumed from the power supply network and this leads to inadmissible distortion of the network voltage curve and to disturbance in the operation of the other consumers of this network in the case of insufficient short-circuit power of the supply network.

To compensate the higher harmonics of the current and reactive power, use is made of a filter and compensator unit. If the controlled rectifier does not allow one to adequately compensate the voltage fluctuation in the given network, it is necessary to perform dynamic compensation of the reactive component of the current and this complicates the power supply system.

Known in the art is a three-phase power supply for a single electrode smelting furnace comprising a transformer whose primary windings are connected to the power line, a controlled thyristor rectifier connected to the secondary windings of the transformer and based on a bridge circuit, and a reactor in the dc circuit connected to one output of the thyristor rectifier. The smelting furnace electrode is connected to the other output of the thyristor rectifier.

The comparatively high reactive component in the consumed current, whose value follows the power network voltage fluctuation, does not allow one to adequately reduce this fluctuation.

SUMMARY OF THE INVENTION

The basic object of the invention is to provide a controlled power supply which would make it possible to reduce the level of voltage fluctuation in the power supply line and to reduce the amount of higher harmonics in the supply current using simple means due to modification of the power supply electric circuit.

This object is attained by proving a controlled power supply for feeding electric arc processes comprising an ac-to-dc voltage inverter having a matching transformer and a rectifier based on a bridge circuit and connected to the matching transformer; the dc diagonal, which is the rectifier output, has electrodes, between which an electric arc is initiated; a circuit to control the voltage across the electrodes having a comparator to compare the actual rectified voltage with a preset value of this voltage; and a device to control the position of the electrodes whose input is connected to the comparator and which varies the position of the electrodes relative to each other, according to the invention, the power supply has a single-phase an ac-to-dc voltage inverter having two phase-shifting circuits connected in series and coupled to the matching transformer; one of the phase-shifting circuits has a choke and the other one has a capacitor; each phase-shifting circuit is connected to the corresponding input of the diode; additional diodes having a junction connected to the junction of the phase-shifting circuits and connected to the output of the main rectifier in the same polarity with the elements of this diode connected to the electrodes.

The bridge circuit rectifiers connected to the first phase-shifting circuit may be made as controlled semiconductor diodes.

It is reasonable that the matching transformer has two secondary windings, and the first phase-shifting circuit is formed by the first secondary winding of the matching transformer and a choke, while the second phase-shifting circuit is formed by the second secondary winding of the matching transformer connected accordingly to the first secondary winding, and a capacitor; in this case, the junction of connection of the phase-shifting circuits is connected directly to the junction of the additional diodes.

It is also expedient that the ac-to-dc voltage inverter has a second matching transformer whose secondary winding is connected in series with the first phase-shifting circuit and connected in the same polarity to the secondary winding of the first matching transformer; the first phase-shifting circuit includes the first secondary winding of the first matching transformer and a choke; the second phase-shifting circuit includes the second matching transformer and a capacitor connected in series with the secondary winding of the second matching transformer.

Furthermore, it is reasonable that the ac-to-dc voltage inverter has a second matching transformer whose secondary winding is connected in series and in the same polarity winding of the first matching transformer; the first phase-shifting circuit includes the first secondary winding of the first matching transformer and a choke; the second phase-shifting circuit includes the second secondary winding of the first matching transformer, the second matching transformer and a capacitor connected in series with the first winding of the second matching transformer.

It was also found expedient that the ac-to-dc voltage inverter has a second matching transformer whose secondary winding is connected in the same polarity and in series with the secondary winding of the first matching transformer; the first phase-shifting circuit includes the first matching transformer and a choke connected in series with the primary winding of the first matching transformer, while the second phase-shifting circuit includes the second matching transformer and a capacitor connected in series with the primary winding of the second matching transformer.

When a matching transformer having at least one additional secondary winding is used, the ac-to-dc voltage inverter may also have additional phase-shifting circuits in an amount corresponding to the number of additional secondary windings of the matching transformer, each of which including a corresponding secondary winding of the matching transformer and a choke or capacitor, and additional diodes; in this case, each additional phase-shifting circuit corresponds to one pair of additional diodes connected in the same polarity to all additional diodes.

The junction of the additional diodes may be connected through a current rise rate inhibition circuit including a choke.

It is also found reasonable that the second phase-shifting circuit has at least one additional capacitor whose one terminal is connected to the diode through two its own diodes having a junction and connected to the rectifier output in the same polarity with the bridge circuit rectifiers, while the other terminals of all capacitors are connected to each other.

The ac-to-dc voltage inverter may have at least one additional bridge circuit, and the first phase-shifting circuit may have additional capacitors whose number corresponds to that of the additional bridge circuits; one terminal of each additional bridge circuit is connected to the output of the main capacitor, while the other terminal of each additional capacitor is connected to the a-c diagonal of a corresponding additional bridge circuit; the first phase-shifting circuit may include additional chokes whose number corresponds to that of the additional bridge circuits; each choke is inserted in the a-c diagonal of the corresponding additional bridge circuit, in which case each additional bridge circuit may be built around semiconductor diodes, which are connected in the same polarity with the diodes of the main bridge circuit, said additional bridge circuit being connected to the electrodes.

If the controlled power supply is three-phase, it is preferable that it comprises in each phase at least one single-phase ac-to-dc voltage inverter, while all the single-phase inverters are connected in parallel at the d-c side and connected to the electrodes.

An additional choke may be inserted between the electrode and the corresponding output of the additional diodes of the single-phase inverter of each phase.

It is reasonable that in the ac-to-dc voltage inverter of each phase the phase-shifting circuit with a capacitor includes two windings in different phases of the matching transformer, connected to each other and to the capacitor of the corresponding phase-shifting circuit.

The series-connected phase-shifting circuits of all phases can be connected in a delta circuit while in the rectifier system all pairs of diodes connected in parallel and consisting of diodes of different phases are combined in one diode or the series-connected phase-shifting circuits of all phases are connected in a star circuit while in the rectifier system all groups consisting of semiconductor diodes connected in parallel and including diodes of different phases are combined in one rectifier, or the series-connected phase-shifting circuits of all phases are connected in a "slip delta" circuit, while all pairs of diodes connected in parallel and including diodes of the main rectifier circuit and additional diodes of the adjacent phase are combined in one additional rectifier.

In each phase of the inverter, the phase-shifting circuit end comprising a capacitor or the phase-shifting circuit end comprising a choke is connected to the junction of the additional chokes and the current rise rate inhibition circuit reducing the current rate in the adjacent phase, and pairs of diodes connected in parallel and including the rectifier diodes and additional diodes of the adjacent phase are combined in one additional rectifier.

The proposed technical solution makes it possible to create a simple controlled power supply, e.g., for an electric arc furnace, which features low weight and dimensions, a simple design, a high power factor, a low content of higher harmonics in the supply current and a low level of the voltage fluctuation produced in the power supply line.

The invention will be better understood from the following detailed description of some embodiments of the invention with reference to the accompanying drawings, in which:

DESCRIPTION OF THE PREFERRED EMBODIMENTS

Figure 1:
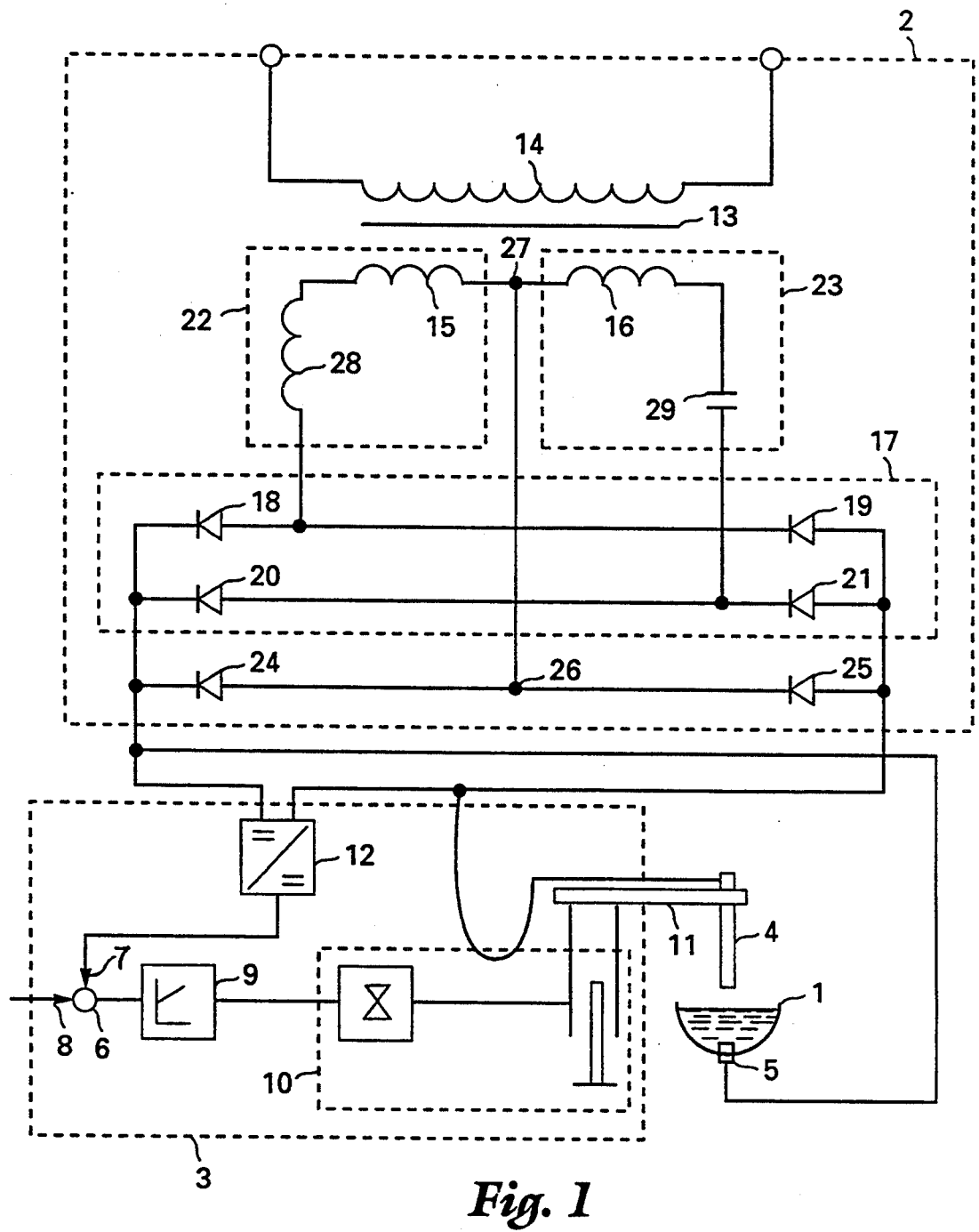
FIG. 1 is an electric diagram of the controlled power supply, according to the invention.

The controlled power supply for processes using an electric arc is discussed on an example of a power supply for an electric arc furnace 1 (FIG. 1).

The power supply comprises an ac-to-dc voltage inverter 2 and a circuit 3 to control the voltage across the electrodes 4, 5, between which an electric arc is initiated. The circuit 3 has a comparator 6 to compare the real voltage applied to the negative input 7 with a preset value of the voltage applied to the positive 8. Connected to the output of the comparator 6 is a device to control the position of the electrode 4 including a regulator 9 itself and a slave unit 10 varying the position of the electrode 4 via a bracket 11 on which the electrode 4 is mounted.

The input 7 of the comparator 6 is connected to the output of the inverter 2 through a measuring converter 12.

The inverter 2 is made as a single-phase device and includes a matching transformer 13 having a primary winding 14 and two secondary cumulative windings 15 and 16, a rectifier 17 connected to the transformer 13 and based on semiconductor diodes 18, 19, 20 and 21 connected in a bridge circuit. The d-c diagonal of the rectifier 17 is an output of the inverter 2 and is connected to the electrodes 4 and 5 of the electric arc furnace 1 and to a measuring converter 12.

The inverter 2 also has two phase-shifting circuits 22 and 23 connected in series and two additional rectifiers 24 and 25 having a junction 26 connected to a junction 27 of the phase-shifting circuits. The rectifiers 24 and 25 are also connected to the output of the rectifier 17 in the same polarity with the semiconductor diodes 20, 21 connected to the electrodes 4,5.

As shown in FIG. 1, the first phase-shifting circuit 22 includes one secondary winding 15 connected to a choke 28, while the second phase shifting circuit 23 has another secondary winding 16 connected to a capacitor 29, and the junction 27 of the phase-shifting circuits is connected directly to the junction 26 of the additional rectifiers 24 and 25. The choke 28 and the capacitor 29 have other outputs connected to the a-c diagonal of the rectifier 17.

Figure 2A:
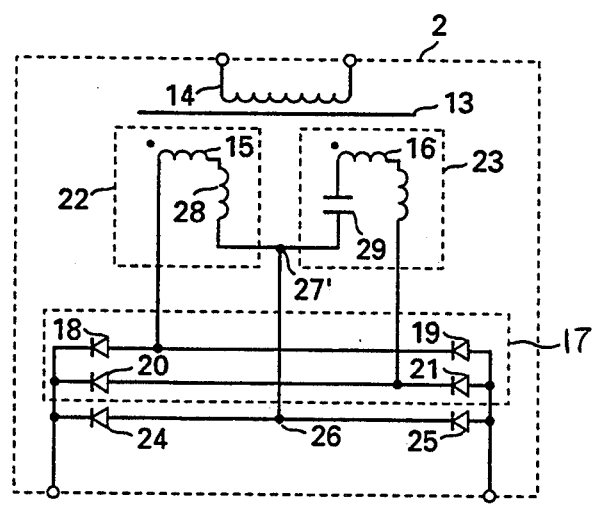
FIG. 2, a, b, c show versions of connection in the ac-to-dc voltage inverter used in the power supply, according to the invention.
Figure 2B:
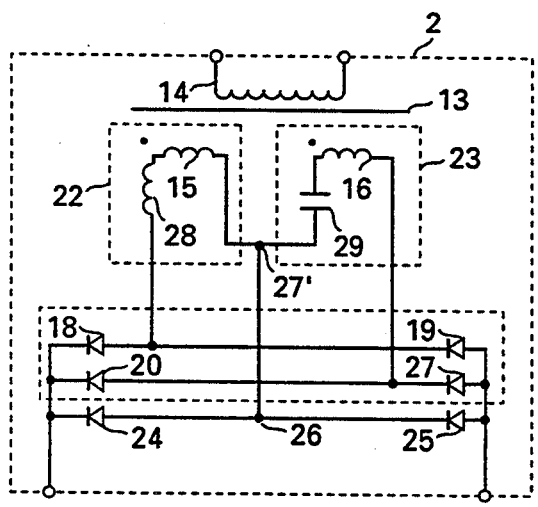
Figure 2C:
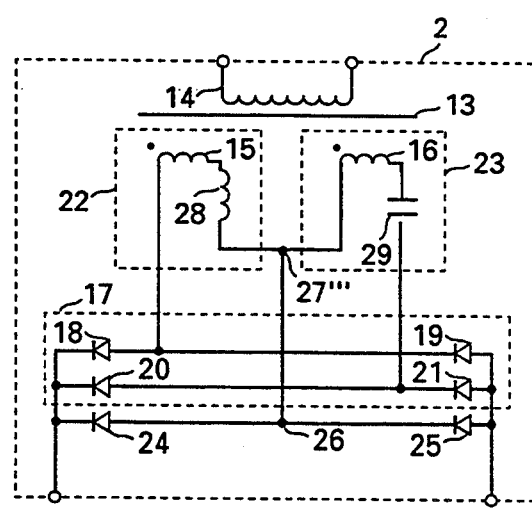

Shown in FIG. 2 are possible embodiments of the phase-shifting circuits 22 and 23 and their junction 27 which can be a junction 27' (FIG. 2a) of the terminals of the choke 28 and capacitor 29, or a junction 27" (FIG. 2b) of the terminals of the secondary winding 15 of the circuit 22 and capacitor 29, or a junction 27''' (FIG. 2c) of the terminals of the choke 28 and secondary winding 16 of the circuit 23.

The rectifiers 18, 19 of the bridge circuit, which are connected to the phase-shifting circuit 22, may be made controllable (FIG. 2a). This makes it possible to control the power factor of the power supply source and can be used in all embodiments of a single-phase or three-phase source.

Consider other embodiments of the phase-shifting circuits 22 and 23.

In the case of low voltages, the capacitor 29 (FIG. 1) should not be inserted in the circuit of the secondary winding 16 of the transformer 13. The capacitance of this capacitor 29 features inverse dependence on the square of the voltage. Therefore, a low voltage increases the capacitance, size and cost of the capacitor 29. This may be avoided if the capacitor 29 is connected in the primary circuit of the matching transformer 13.

Figure 3:
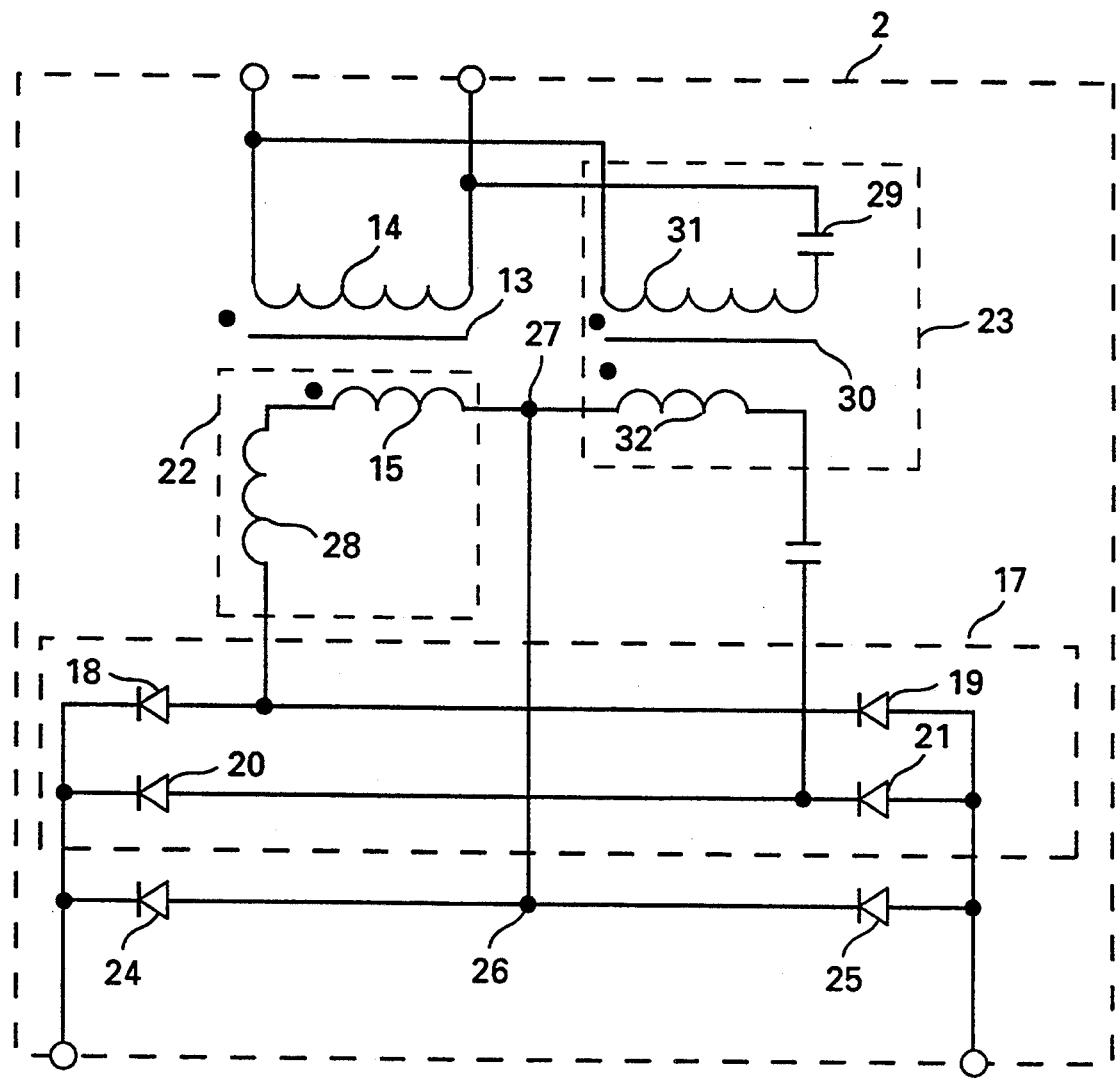
FIG. 3 shows the same inverter, according to the invention, with a capacitor in the primary winding circuit.

In FIG. 3 the inverter 2 has a second matching transformer 30 forming with a capacitor 29 a phase-shifting circuit 23, in which case the capacitor 29 is connected in series to the primary winding 31 of the transformer 30 and this series circuit is connected in parallel to the primary winding 14 of the transformer 13, while the secondary winding 32 of the transformer 13 has one terminal connected to the junction 27 of the circuits 22 and 23 and the other terminal inserted in the a-c diagonal of the rectifier 17.

Figure 4:
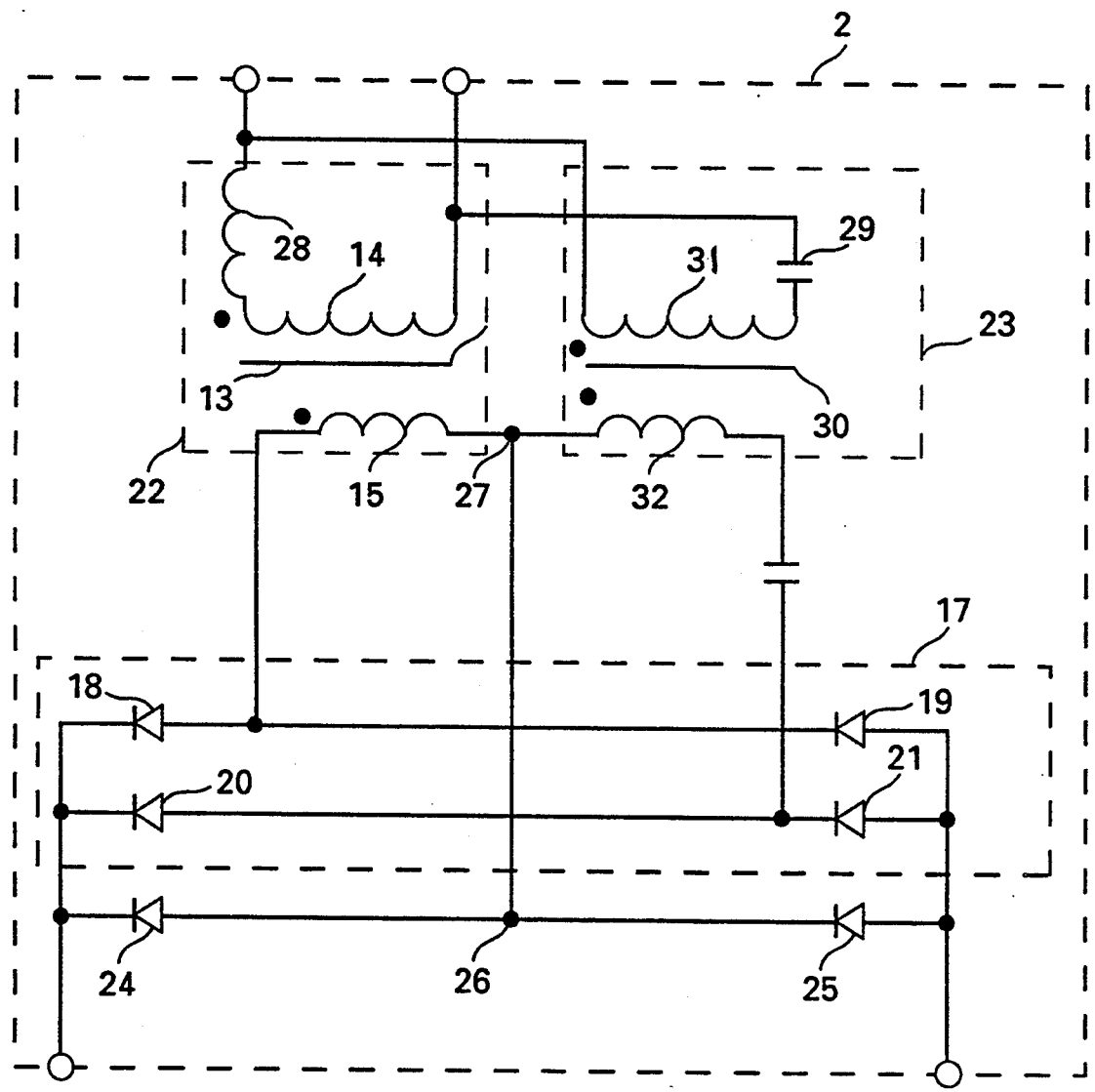
FIG. 4 shows the same inverter, according to the invention, with a capacitor and a choke in the primary winding circuit.

The choke 28 can also be connected to the primary winding 14 of the transformer 13, as shown in FIG. 4, while the secondary winding 15 of the same transformer 13 through its one terminal is connected to the junction 27 of the circuits 22 and 23 and through the other terminal is connected to the rectifier 17.

Such a design of the inverter 2 makes it possible to reduce the current through the choke 28 thus simplifying its construction with high electric-arc currents and low voltage.

The second secondary winding 16 of the transformer 13 can be connected in parallel and accordingly with the secondary winding 32 (FIG. 5) of the other transformer 30. In so doing, the junction 27 of the phase-shifting circuit 22 and $23_1$ is a point of connection of the windings 15 and 16 of the transformer 13. The capacitor 29 is connected in series to the primary winding 31 of the transformer 30 and this series circuit is connected in parallel to the primary winding 14 of the transformer 13 and to the network voltage. In this case, the phase-shifting circuit 23' is formed by the secondary winding 16 of the transformer 13 and the second transformer 30 with a capacitor 29 connected with the primary winding 31 of the transformer 30.

Such a design of the inverter 2 enables one to have a voltage on the capacitor 29 approximately twice the supply voltage.

In order to eliminate a danger of appearance of ferromagnetic resonance in the circuits with the capacitor 29 in the parallel line (FIGS. 3, 4, 5), the capacitor 29 or the secondary winding 32 of the transformer 30 must be connected on parallel to circuits providing a discharge of the capacitor 29 in the case of a sudden drop of the arc current.

Figure 6:
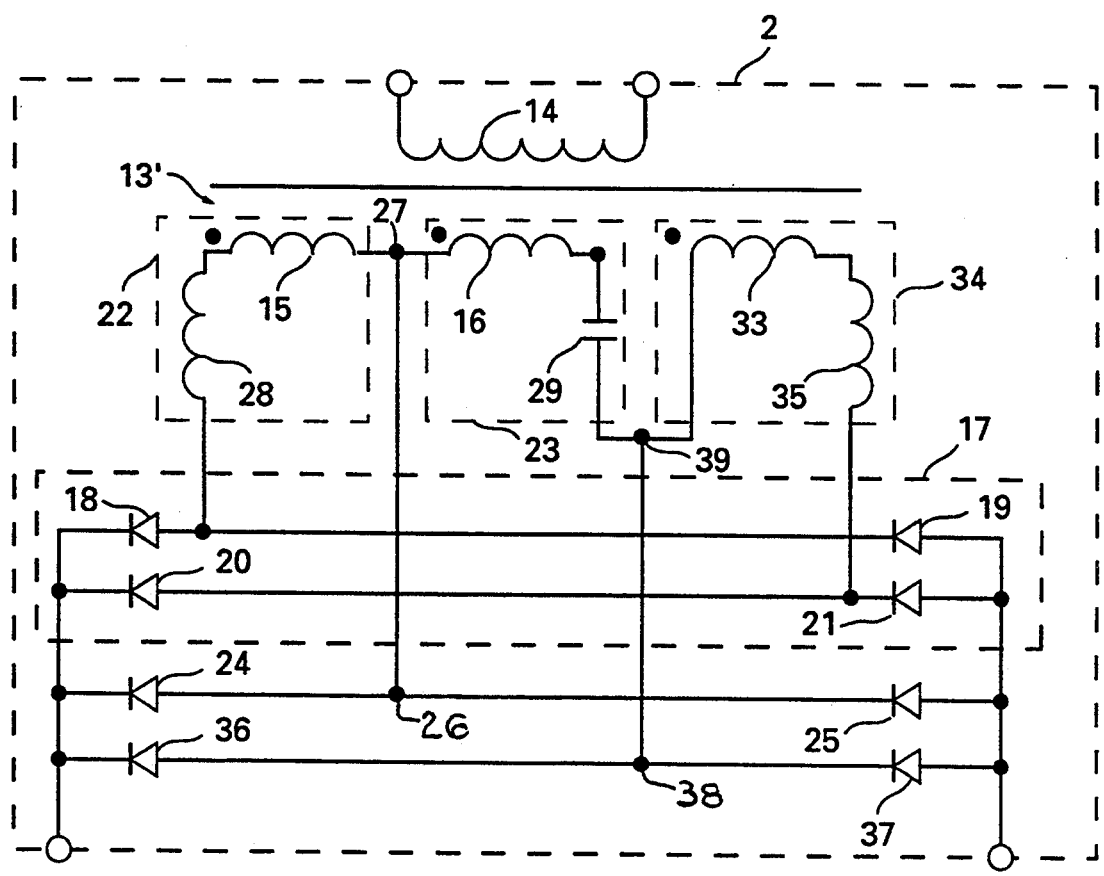
FIG. 6 is another embodiment of the ac-to-dc voltage inverter having more than two phase-shifting circuits, according to the invention.

The inverter 2 may be provided with a matching transformer 13' (FIG. 6) having several secondary windings 15, 16 and 33. In such an inverter 2 the number of phase-shifting circuits 22, 23 and 24 is equal to that of the secondary windings 15, 16 and 33. To simplify the drawing, FIG. 6 shows three phase-shifting circuit 22, 23 and 34, in which one circuit has at least one capacitor 29, the other circuit (22) has a choke and the rest (34) have a capacitor or choke (shown in the drawing is an embodiment with a choke 35 in the circuit 34).

Each phase-shifting circuit 34 above two includes two additional rectifier 36 and 37 connected to the rectifier 24 and 25 in the same polarity, the junction 38 of these rectifiers being connected to the junction 39 of the phase-shifting circuits 23 and 34.

The junction 27 of the phase-shifting circuits is connected to the junction 26 of the additional rectifiers 24 and 25 not only directly, as it is shown in FIGS. 1–6. With insufficient short-circuit capacity of the power supply network, this connection is preferably effected through a circuit 40 (FIG. 7) for reducing the current increasing rate, which usually includes a choke 41. In so doing such a circuit 40 can be used in any previously discussed embodiments of the phase-shifting circuits 22 and 23. For example, according to FIGS. 1–6, the inverter may have at least one current rise rate inhibition circuits circuit 42 (FIG. 8), which is needed when the inverter 2 has more than one phase-shifting circuit (23 and 43) including a capacitor 44 connected to the secondary winding 45 of the transformer 13.

Each additional circuit 42 includes its own choke 46 while the inverter 2 has additional rectifiers 36, 37 for every additional phase-shifting circuit 43.

Figure 9:
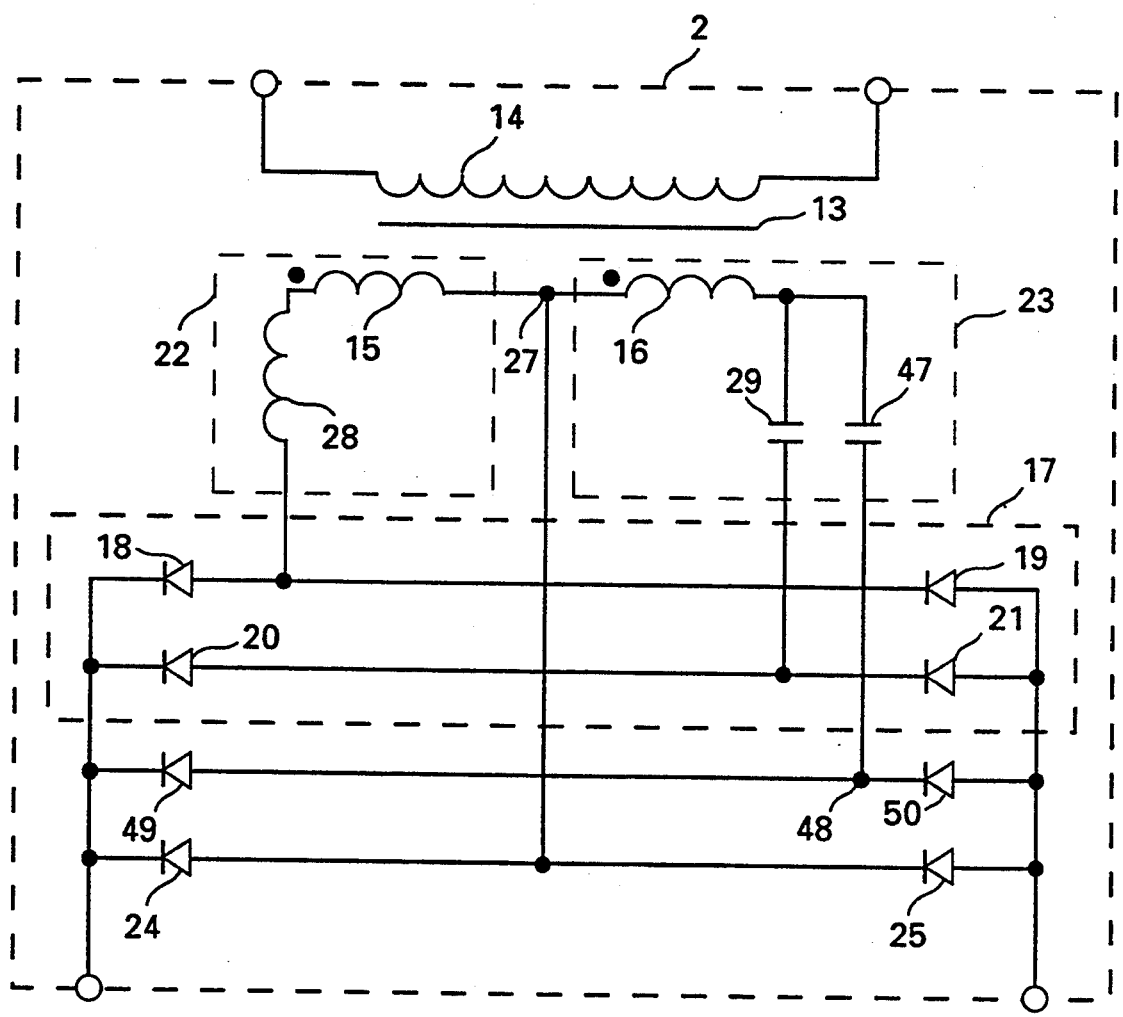
FIG. 9 is the inverter in which the phase-shifting circuit has additional capacitors, according to the invention.

If the power supply source has adequate power capacity, the capacitor 29 (FIG. 1) can be made in the form of batteries of several capacitors connected in parallel. However, the amount of capacitors directly connected in parallel is limited for the safety reasons. Under these conditions, it was found expedient that the phase-shifting circuit 23 includes several capacitors 29, 47 (FIG. 9). In this case, each additional capacitor 47 has one terminal connected to the junction 48 of the additional rectifiers 49 and 50, which are connected to the output of the rectifier 17 in the same polarity with the rectifiers 24 and 25. The other output of the capacitor 47 is combined with the corresponding terminal of the main capacitor 29.

Figure 10:
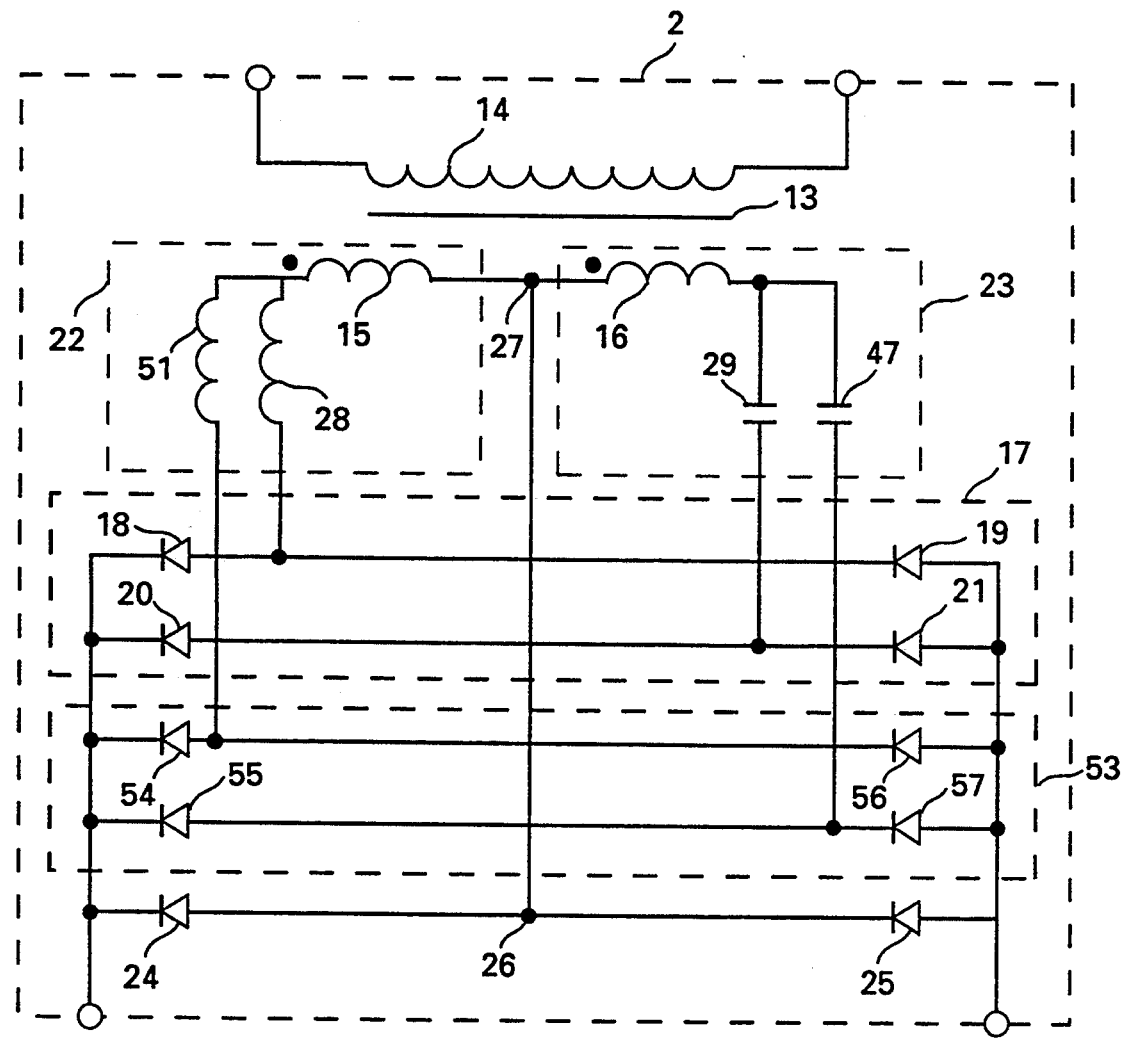
FIG. 10 is an embodiment of the inverter, having elements connected in parallel, according to the invention.

Shown in FIG. 10 is still another embodiment of the inverter 2, in which the first phase-shifting circuit 22 comprises an additional choke 51 and the second phase-shifting circuit 23 comprises an additional capacitor 47, in which case the quantity of additional chokes 51 and capacitors 47 is determined like in the embodiment shown in FIG. 9.

In the given embodiment the inverter 2 consists of low-power elements (chokes 28, 51; capacitors 29, 47; rectifiers 17, 53) operating actually in parallel, and this is reasonable for high-power supply networks.

In this embodiment the inverter 2 comprises also a second bridge circuit 53 with an additional choke 51 and a capacitor 47 in its a-c diagonal. The bridge circuit 53 is based on rectifiers 54, 55, 56 and 57, which are connected in the same polarity with the rectifier 18-21 of the main bridge circuit. The bridge circuit 53 is connected to the output of the inverter 2.

If the controlled power supply is a three-phase device, it has in each phase at least one ac-to-dc single-phase inverter 58 (FIG. 11), 59 and 60, all inverters 58-60 being connected in parallel on the d-c side and are connected to the electrodes 4, 5.

The matching transformer 13 is a three-phase unit having primary windings 61, 62 and 63 in each phase, respectively. It is also possible to use individual transformers in each phase, the windings of these transformers being connected in the same way as the windings of a three-phase transformer.

The rectifiers 17 (FIG. 1) of all single-phase transformers 58-60 (FIG. 11) are combined into a single rectifier 17' which is built around semiconductor diodes 18-21 respectively for each phase in the form of a single bridge circuit.

The three-phase inverter 2' formed as described above also has in each phase two phase-shifting circuits 22 and 23 and two additional rectifiers 24 and 25 corresponding to said phase-shifting circuits. In so doing, the rectifier 24 and 25 of all phases are connected in the same polarity with the rectifiers 18-21 of the common bridge circuit and are connected to the output of the rectifier 17'. The junction 26 of the pair of rectifiers 24 and 25 is connected to the junction 27 of the phase-shifting circuit 22 and 23 of the corresponding phase.

Figure 12:
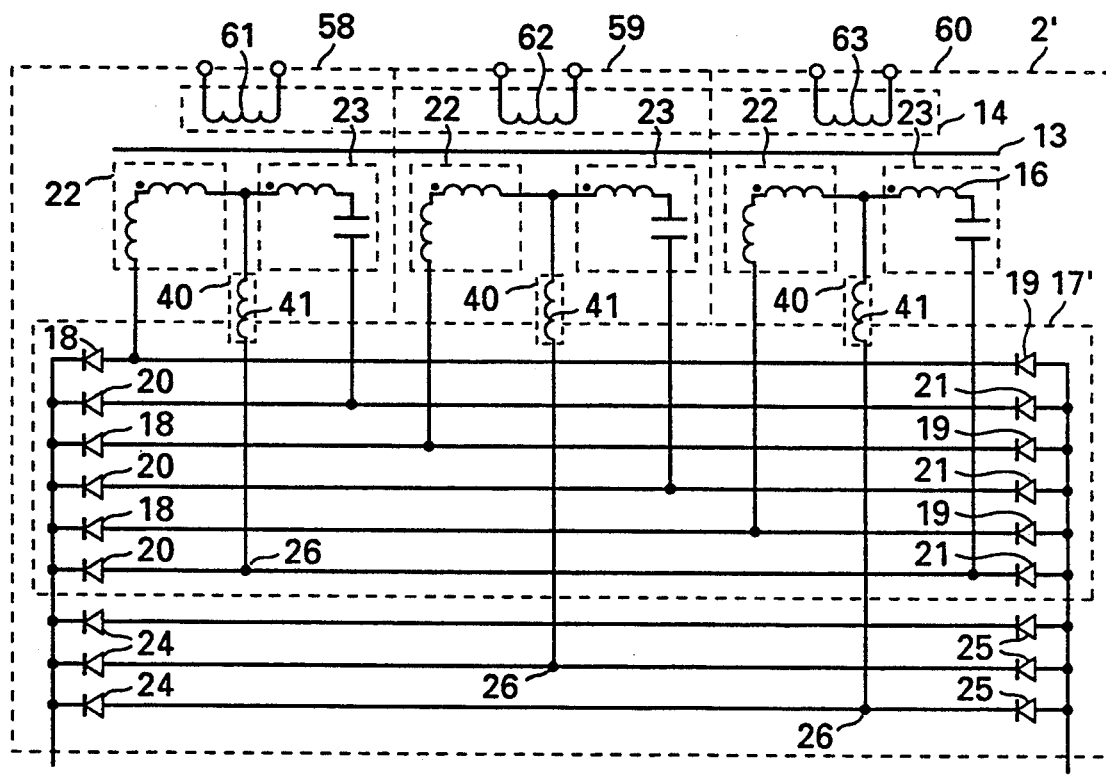
FIG. 12 is an embodiment of a three-phase ac-to-dc voltage inverter used in the power supply and having current rise rate inhibition circuits, according to the invention.

FIG. 12 shows single-phase inverters which form a three-phase inverter 2'; each of these inverters has a circuit 40 for decreasing the rate of rise of the current through the circuit including a phase-shifting circuit 23 and a capacitor 29.

An embodiment of the invention is also possible, in which between each electrode 4 (FIG. 13) and 5 and the like output of the additional rectifiers 24 and 25 there is inserted an additional choke 64 and 65, respectively, which also makes it possible to reduce the rate of rise of the current in the circuits of all three phases which include the phase-shifting circuit 23 having a capacitor 29. In this case, only two chokes 64 and 65 are required.

Figure 11:
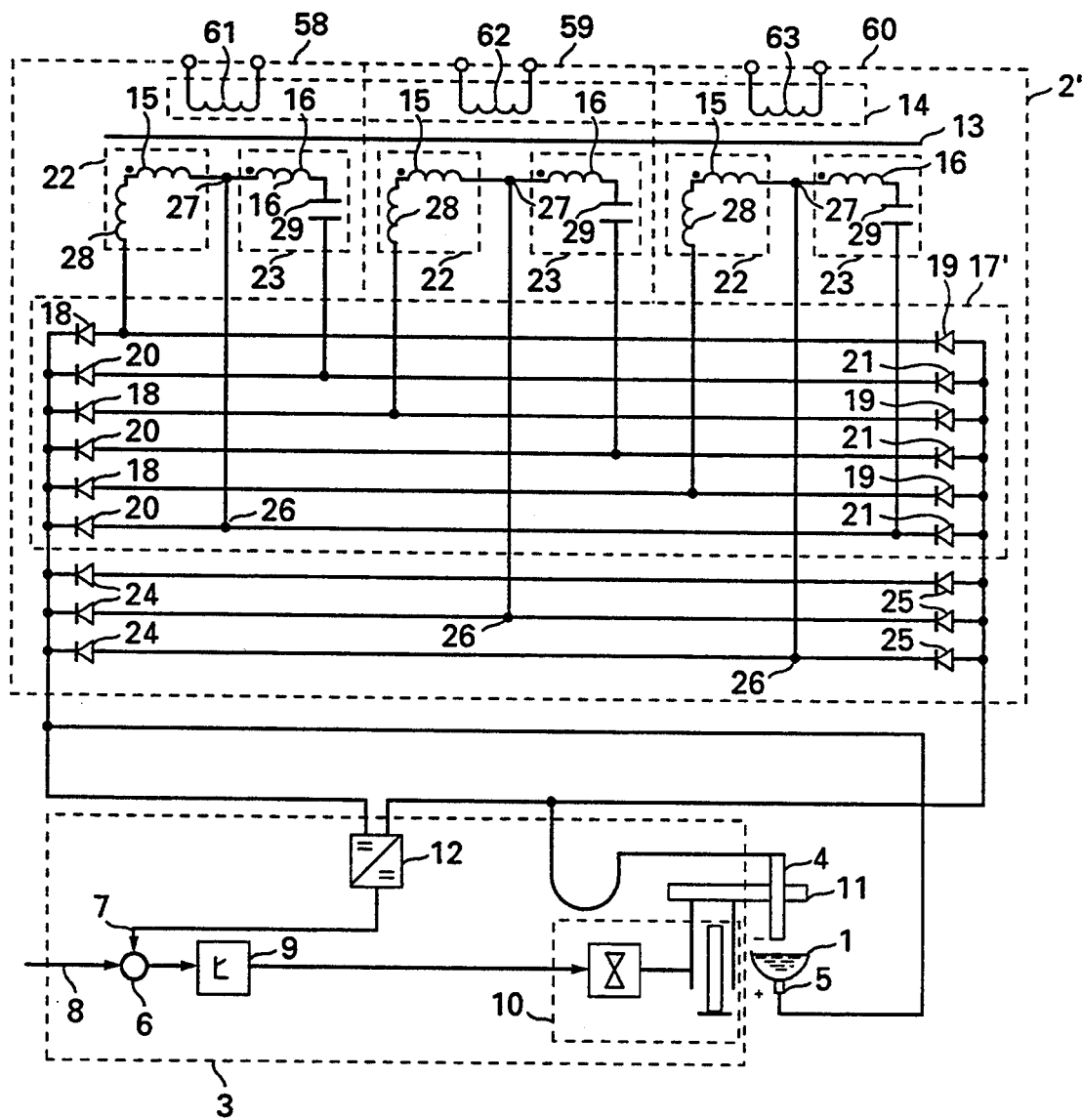
FIG. 11 is a diagrammatic view of the three-phase controlled power supply, according to the invention.
Figure 13:
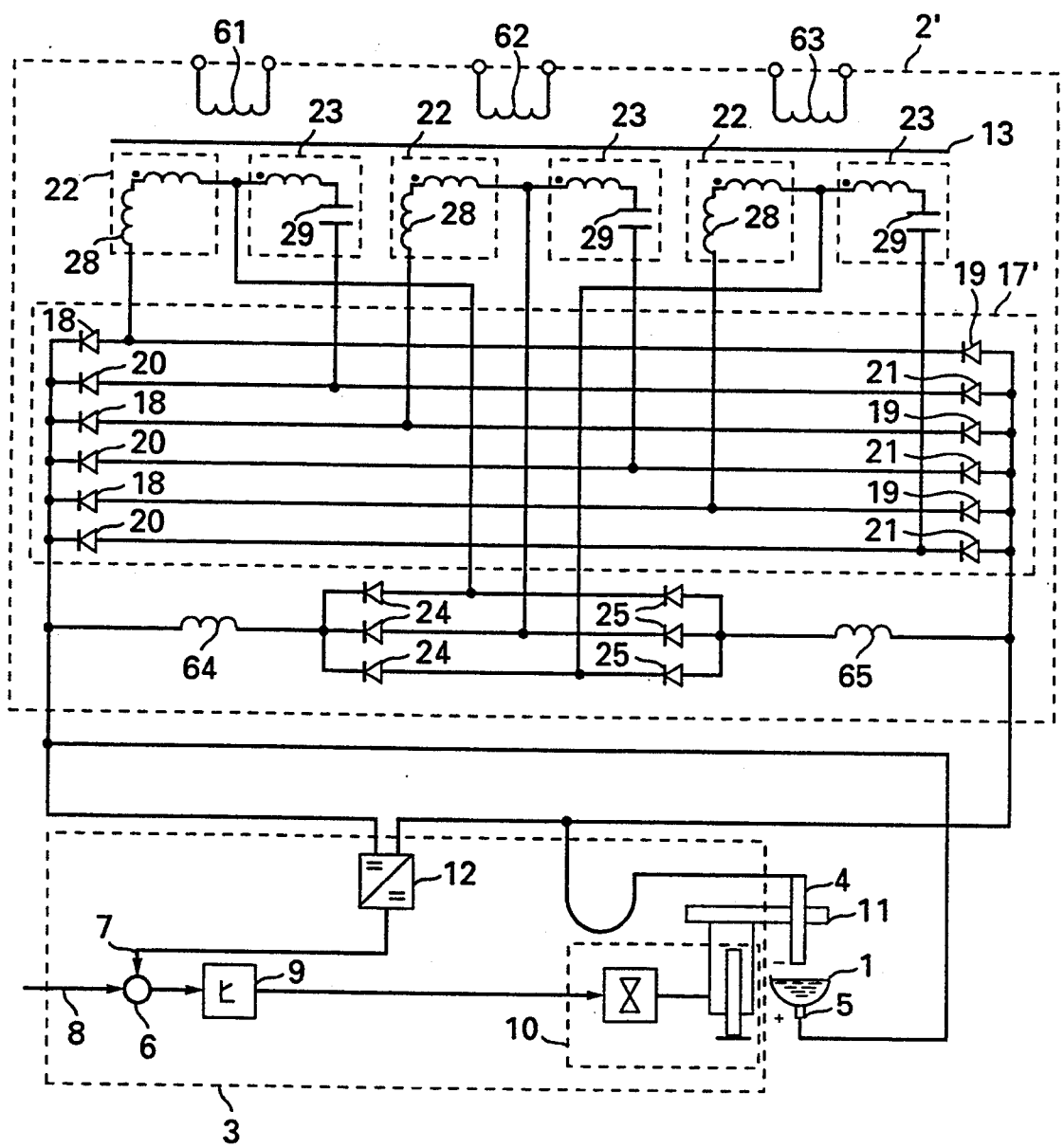
FIG. 13 is a schematic diagram of the three-phase controlled power supply having additional chokes in the d-c circuit, according to the invention.

Each three-phase inverter shown in FIGS. 11-13 can be made of any single-phase inverters shown in FIGS. 1-10, as described above. Each phase of these three-phase inverters can also be made of several parallel-connected single-phase inverters on the d-c side. In this case, it is possible to connect in parallel in one phase any single-phase inverters shown in FIGS. 1-10.

In the three-phase power supply the phase-shifting circuit 23 comprising a capacitor 29 can be provided with two windings 66 (FIG. 14) and 67 of the transformer 13 which are disposed in different phases of this transformer 13. The windings 55, 67 and the capacitor 29 are connected in series and form a phase-shifting circuit 23'. The location of the windings 66 and 67 in different phases provides distribution of the switching current surge through the phase-shifting circuit 23' between the two phases of the transformer 13 and this decreases the amplitude of the higher harmonics in the primary windings 61-63 and in the current consumed from the power line.

In the same three-phase power supply the additional chokes 64 and 65 are connected as shown in FIG. 13 to inhibit the current rise rate.

The three-phase inverter 2' for the controlled power supply having phase-shifting circuit 23' with a capacitor 20 and two windings 66 and 67 in the different phases, according to the above, may have circuits 40 (FIG. 15) to inhibit the current rise rate which connect the junction 27 of the phase-shifting circuit 22 and 23 to the junction 26 of the additional rectifiers 24, 25 in all three phases. Each circuit 40 includes a choke 41.

Figure 16:
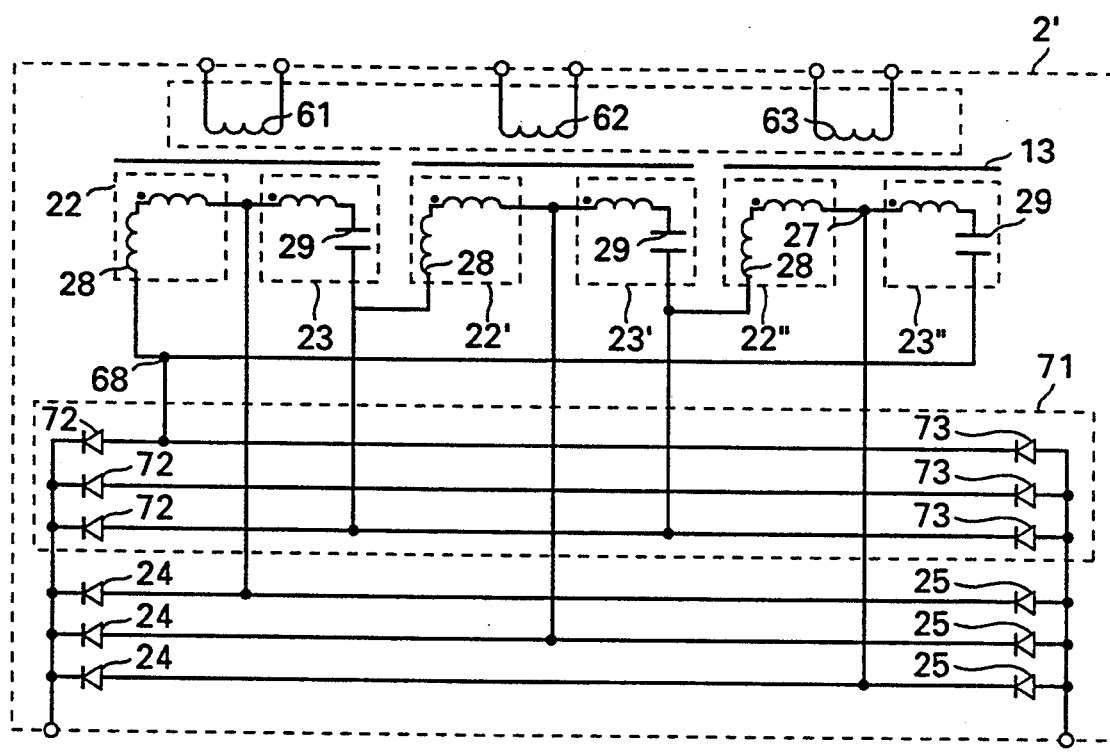
FIG. 16 is a schematic diagram of the same inverter having delta-connected phase-shifting circuits according to the invention.

The series-connected phase-shifting circuits 22, 23 of all phases set up a delta circuit, as shown in FIG. 16. In so doing, the output part of the phase-shifting circuit 23 of the first phase containing a capacitor 29 is connected to the output of the phase-shifting circuit 22' of the second phase containing a choke 28, or to the output of the phase-shifting circuit 22' of the third phase containing a choke 28, while the outputs of the phase-shifting circuit 23' and 23" of the second and third phases are connected similarly to the connection of the circuit 23 in the first phase. In this way, the formed junctions 68, 69, 70 of the phase-shifting circuit of different phases are "apices" of the delta and these connections create paths for the current from one phase of the inverter to the other, which causes changes of its external characteristic.

The rectifiers 17 of all single-phase inverter can be in the form shown in FIG. 11 or be combined in a common rectifier made in the form of a single bridge circuit 71 based on semiconductor diodes 72 and 73, and the junctions 68, 69, 70 of the phase-shifting circuit 22,23 of the different phases are connected to the corresponding input of the common bridge circuit 71, which is the a-c diagonal of this circuit.

In so doing, the rectifiers 18, 19 of the first phase (FIG. 11) and the parallel-connected rectifiers 20, 21 of the second phase (or the rectifiers 20, 21 of the third phase) are united into a single pair of rectifiers (72, 73) (FIG. 16), and the rectifiers 18, 19 and 20, 21 of the remaining phases are united in a similar way. The parallel connection of the rectifiers 18, 19 with the rectifiers 20, 21 occurs when connecting the phase-shifting circuit in the inverter 2' (FIG. 11) in delta.

The three-phase inverter 2' (FIG. 17), in which the series phase-shifting circuits (22, 23) are connected in delta, according to the above, may be provided with current rise rate inhibition circuits 40.

Figure 18:
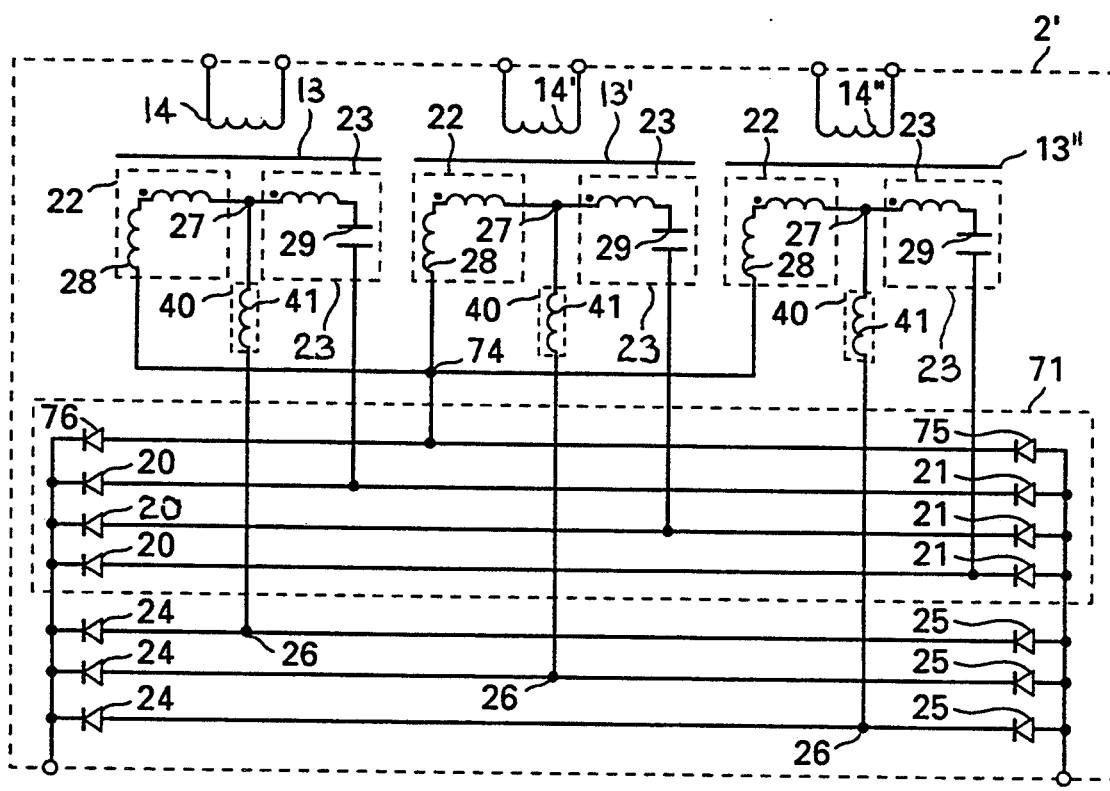
FIG. 18 is a schematic diagram of the same inverter having star-connected phase-shifting circuits and current rise rate inhibition circuits, according to the invention.

FIG. 18 shows that the series-connected phase-shifting circuit 22, 23 of all phases are connected in a "start" network, in which case the no-load voltage of the inverter increases by a factor of square root of three, while its short-circuit current varies insignificantly. The terminals of the phase-shifting circuit 22, including the choke 28, of all three phases (or the terminals of the phase-shifting circuit 23 including the capacitor 29 of all three phases) are connected together and form a junction 74 of the "star". This connection leads to an increase of the no-load current of the power supply. In this case, the rectifiers 17 of all single-phase inverters can be connected in parallel on the d-c side, according to FIG. 11, or they are structurally united in a common rectifier (FIG. 18) made in the form of a bridge circuit 75 based on semiconductor diodes 20, 21 (or 18, 19) and 76, 77, in which case the free ends of the phase-shifting circuits 23 (or 22) of all three phases are connected to the corresponding rectifiers 20, 21 (or 18, 19), and the junction 74 of the phase-shifting circuits 22 (or 23) of all phases are connected to the rectifiers 76, 77.

Figure 14:
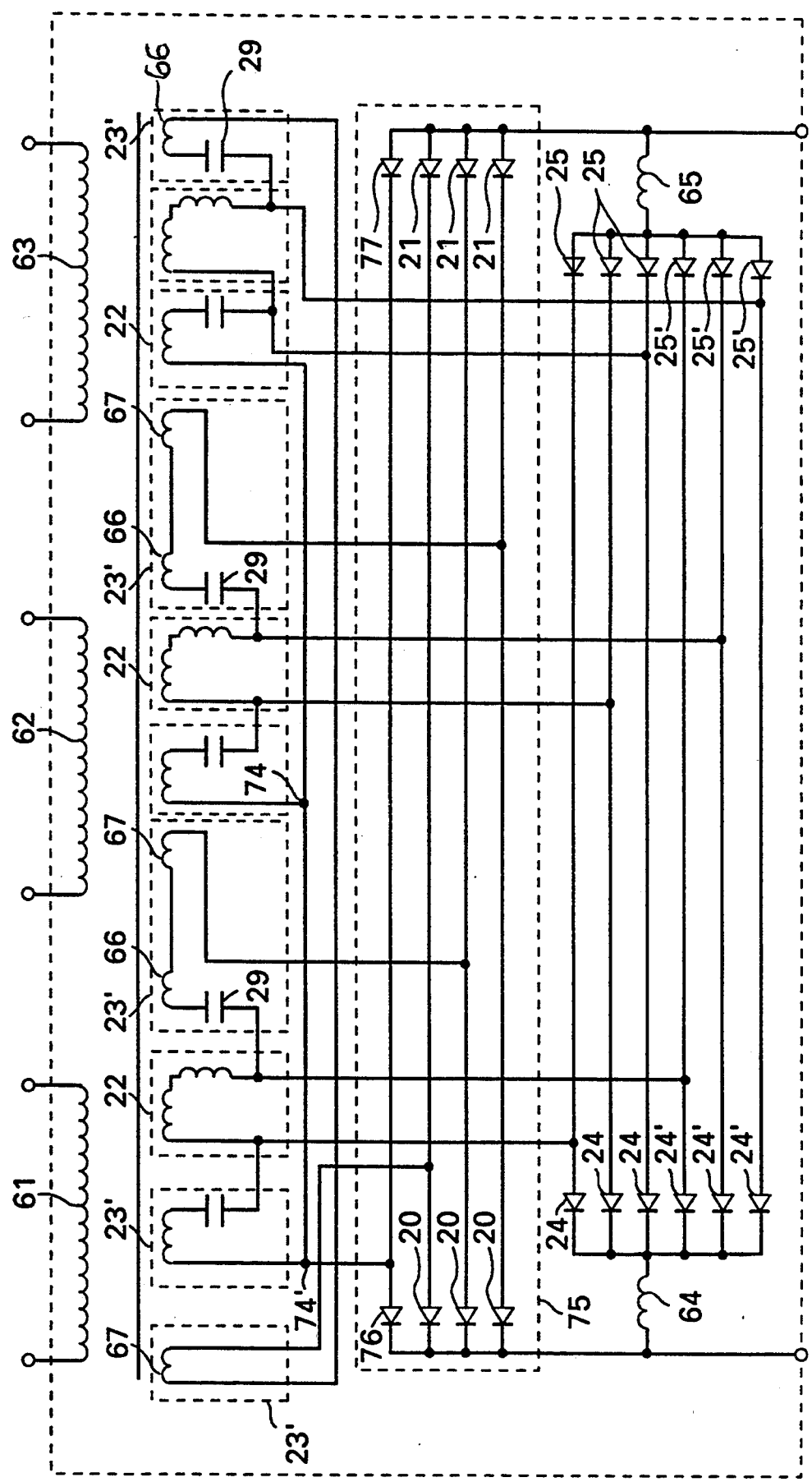
FIG. 14 is a schematic diagram of the three-phase ac-to-dc voltage inverter used in the power supply, according to the invention, in which the capacitive phase-shifting circuits have two windings for two individual phases of the transformer.

FIG. 14 shows an inverter 2 with three series-connected phase-shifting circuits 22, 23, 23' in each phase, which are interconnected in a star at a point 74.

The series-connected phase-shifting circuit 22, 23 of all phases can also be connected in a "slip delta" circuit (FIG. 19), in which in all phases the end 78 of the phase-shifting circuit 21 (or the end 79 of the circuit 22) of one phase is connected to a junction 27 of the phase-shifting circuit of the other phase. In this case, the no-load voltage rises up and the external characteristic of the parallel changes.

In this system the output 78 of the phase-shifting circuit 23 of the first phase comprising a capacitor 29 (or the output 79 of the phase-shifting circuit 22 comprising a choke 28) is connected to the junction 27 of the phase-shifting circuits 22, 23 of the second phase (or the junction 27 of the phase-shifting circuits 22, 23 of the third phase), while the outputs 78 of the phase-shifting circuits 23 (or the outputs 79 of the circuits 22) in the second and third phases are connected to the junctions 27 of the phase-shifting circuit similarly to the connection in the first phase.

The rectifiers 71 of all three phases are connected in parallel on the d-c side, according to FIG. 11, or in all three phases the rectifiers 20, 21 (FIG. 19) (or 18, 19) of the rectifiers 17 of one phase are structurally united with the additional rectifiers 24, 25 of the second or third phase in one pair of additional rectifiers 80, 81, the rectifiers 18, 19 (or 20, 21) of all three phases form one common bridge circuit 82, and the outputs 79 of the phase-shifting circuit 22 (or the outputs 78 of the phase-shifting circuit circuits 23) of all three phases are connected to the corresponding inputs of the common bridge circuit 82, which are the d-c diagonals of this bridge circuits.

Figure 19:
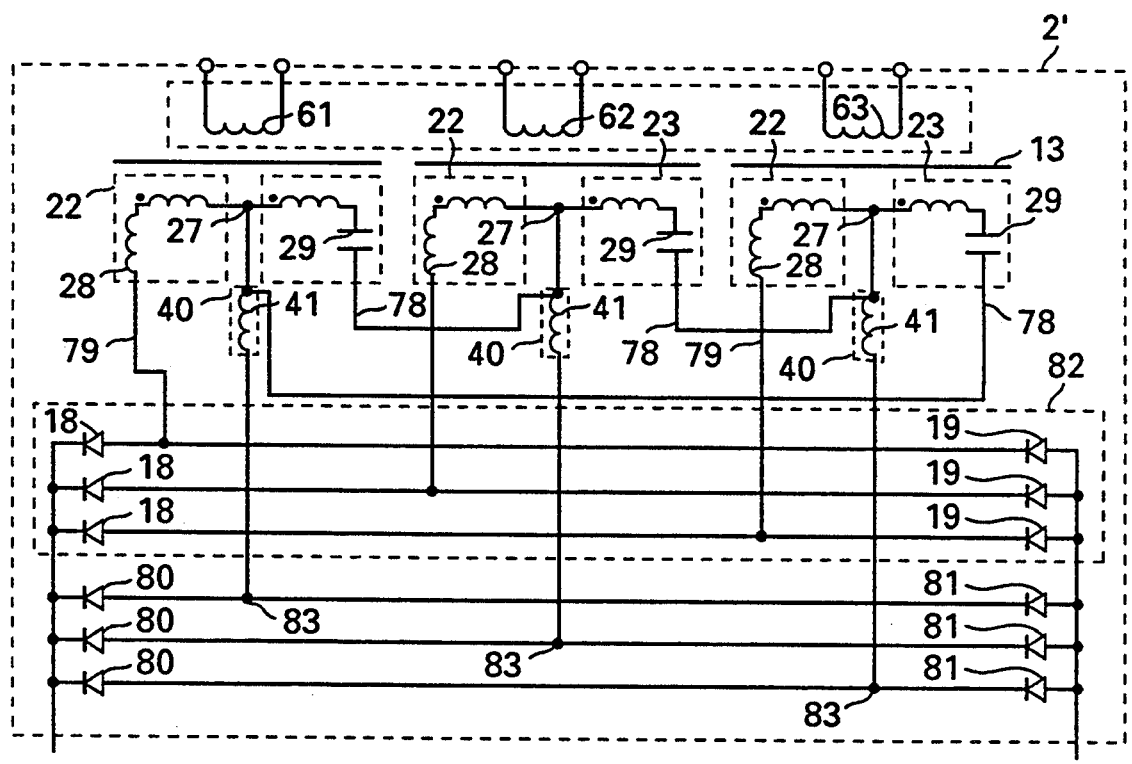
FIG. 19 is a schematic diagram of the same inverter having phase-shifting circuits connected in "slip delta" and current rise rate inhibition circuits, according to the invention.

The three-phase inverters 2', in which the single-phase phase-shifting circuits 22, 23 of the three phases are connected in a "star" or in "slip delta", have in each phase a current rise rate inhibition circuit 40, which connects the junction 27 of the phase-shifting circuits 22, 23 of one phase with the corresponding junction 26 of the additional rectifiers 24, 25 (FIG. 18) or with the corresponding junction 88 of the additional rectifiers 80, 81 (FIG. 19).

Each circuit 40 includes a choke 41.

Figure 20:
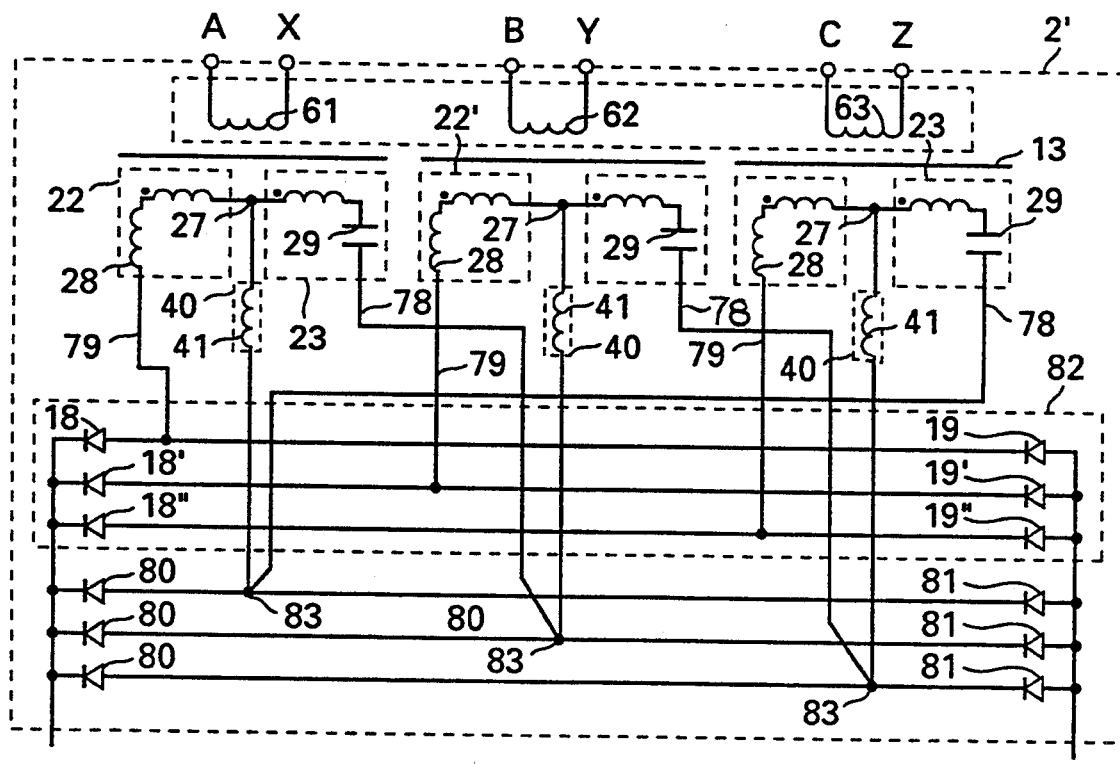
FIG. 20 is a schematic diagram of the same inverter, according to the invention, in which the phase-shifting circuit of one phase is connected to the additional rectifiers of the other phase.

The three-phase inverter 2 (FIG. 20) has in each phase a current rise rate inhibition circuit 40, and in this inverter in each phase the end 78 of the phase-shifting circuit 23 containing a capacitor 29, or the end 79 of the phase-shifting circuit 22 containing a choke 22 is connected to the junction 83 of the additional rectifier 80, 81 and current rise rate inhibition circuits circuit 40 in the other phase. Such a connection decreases the load on the current rise rate inhibition circuit 40 (compared to the connection in FIG. 19).

The connection of the phase-shifting circuits of different phases in delta, "star" and "slip delta" can be performed in all three-phase inverters, which are composed of single-phase inverters according to FIGS. 1–8 and FIG. 10, by connecting them on parallel on the d-c side, as described above.

Figure 21:
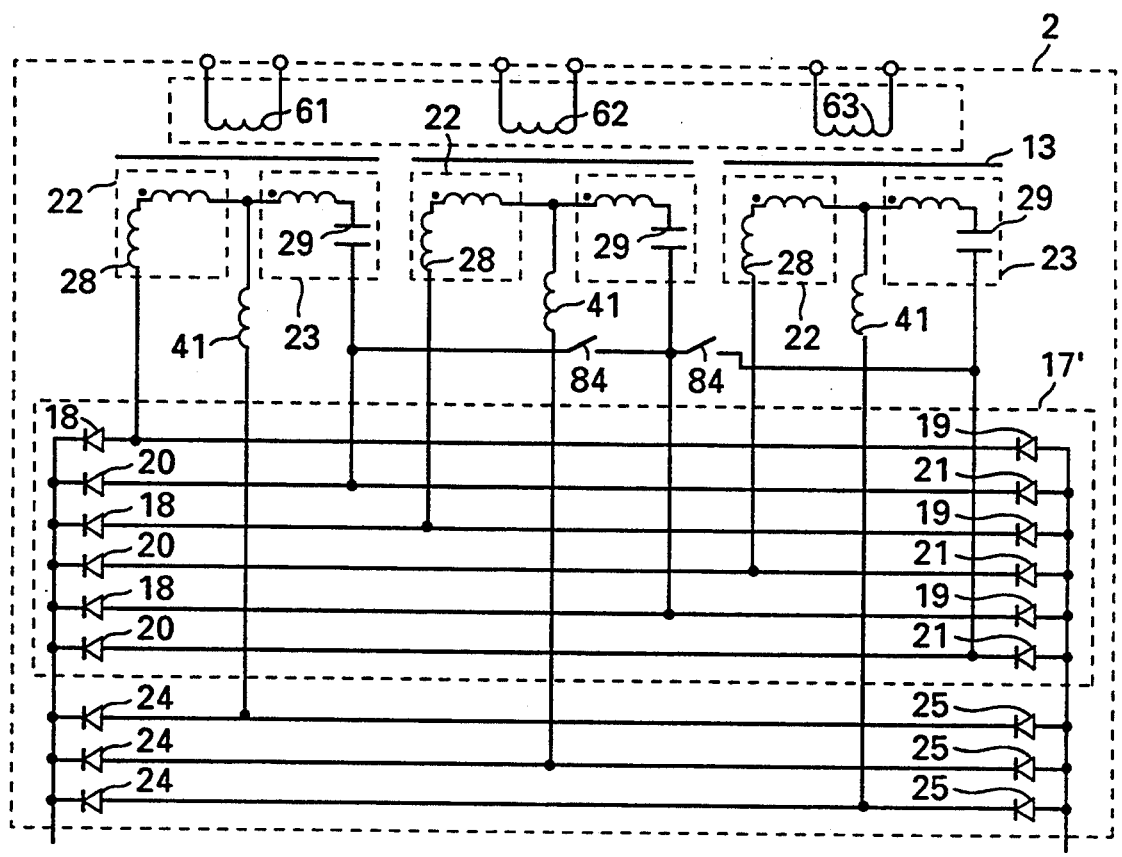
FIG. 21 is a schematic diagram of the same inverter having switches for connection of the phase-shifting circuits in a star, according to the invention.

The connections between the phase-shifting circuits of different phases are made either stationary (FIGS. 16–20) or through switches 84 (FIG. 21). The switches 84 allow one to vary the output characteristic and the no-load current voltage of the inverter 2" stepwise.

The controlled power supply for an electric arc furnace operates as follows:

Prior to operation the comparator 6 is supplied with a present value of rectified voltage $U_8$ which is somewhat higher than the inverter no-current voltage $U_{do}$. In this case, a positive signal is produced at the output of the comparator 6 and the electrode 4 of the furnace 1 is lifted up to its extreme top position. At the same time, the voltage from the a-c parallel line is applied to the transformer 13 of the inverter 2. When the electrode 4 of the furnace 1 is raised, there is no load on the inverter 2 and no voltage drop is observed on the reactive elements (choke 28 and capacitor 29). A no-load voltage $U_{do}$ appears at the output of the rectifier 17. The no-load voltage is a sum of voltages of both secondary windings 15 and 16 of the transformer 13.

To put the parallel into operation, the preset value of rectified voltage $U_8$ is applied to the comparator 6, the voltage $U_8$ being lower than the no-load voltage of the inverter 2. A negative signal is produced at the output of the comparator 6, which causes movement of the electrode 4 down, which continues till a short circuit appears in the circuit 1. In this case, the output voltage of the inverter 2 drops down almost to zero resulting in appearance of a positive signal at the output of the comparator 6, and the electrode 4 starts moving up. In so doing, an electric arc is initiated in the furnace 1 between the electrode 4 and the charge, the length of this arc starting being increased. With a high-power electric arc in the furnace (in the high current range) the voltage depends on the arc length in approximately direct proportion and almost does not depend on the current $I_d$ of the power supply.

During the motion of the electrode 4 upwards the arc length and the voltage $U_1$ across the arc increase. The inverter 2 reacts on the load variation which is expressed by a change of the arc voltage in a parametric manner, i.e. by setting new values of current and voltage without a control action. The voltage $U_1$ required for the given arc length is obtained automatically due to a change of the voltage drops and current phases on the choke 28 and capacitor 29, which are connected in series with the arc. The electrode 4 is raised and the arc length is increased till the rectified voltage $U_d$ becomes to be equal to the preset value of the rectified voltage $U_8$. In this case, the signal at the output of the voltage regulator 9 will be zero and the electrode 4 stops. Then the position 4 is corrected automatically as the charge is being melted. A change of the preset voltage $U_8$ results in a change of the arc length till a new voltage is obtained.

The above-described control is possible owing to a combination of the plasma properties, electrode position regulating circuit and inverter with reactive elements in the power circuits. In this scheme, the electrical quantity, i.e. the voltage on the arc and, at the same time, at the inverter output is controlled mechanically, by moving the electrode 4. The inverter 2 needs no controlled rectifiers.

Since the arc voltage $U_1$ can vary from zero in the short-circuit operating mode to the no-load voltage $U_{do}$ of the inverter 2, we may distinguish three individual operating modes of the inverter 2. The first mode corresponds to operation under high load currents and with a short circuit, the second mode corresponds to operating under rated conditions and near them, and the third mode corresponds to operation with low load current or close to the no-load current. For a single-phase power supply in accordance with the circuit shown in FIG. 1, the distribution $I_d = f(U_d)$ is given in FIG. 22. These three operating modes differ by composition, sequence and duration of the current loops in the inverter 2, six loops in total (FIG. 1).

The first loop: "winding 15—choke 28—rectifier 18—furnace 1—rectifier 25—winding 15"; the second loop: "winding 16—capacitor 29—rectifier 20—furnace 1—rectifier 25—winding 16"; the third loop: "winding 16—capacitor 29—rectifier 20—furnace 1—rectifier 19—choke 28—winding 16"; the fourth loop: "choke 28—winding 15—rectifier 24—furnace 1—rectifier 19—choke 28"; the fifth loop: "capacitor 29—winding 16—rectifier 24—furnace 1—rectifier 21—capacitor 29"; the sixth loop: "winding 15—choke 28—rectifier 18—furnace 1—rectifier 21—capacitor 29—winding 16—winding 15".

In the first and fourth loops the furnace is supplied from the inductive phase-shifting circuit 22, in the second and fifth loops the furnace is fed from the phase-shifting circuit 23. In so doing, the power supply voltage in these circuits is equal to the voltage of one secondary winding 15 or 16. In the third and sixth circuits the furnace is fed from the phase-shifting circuits 22 and 23 connected in series, and the power supply voltage in these loops is equal to the sum of voltages of both secondary windings 15 and 16. In these three pairs of loops one of them, e.g., the first, exists in first half-wave, while the second one, e.g., the fourth, exists in the second half-wave.

The operation of the inverter 2 in mode 1 (FIG. 22) is effected as follows:.

Figure 23:
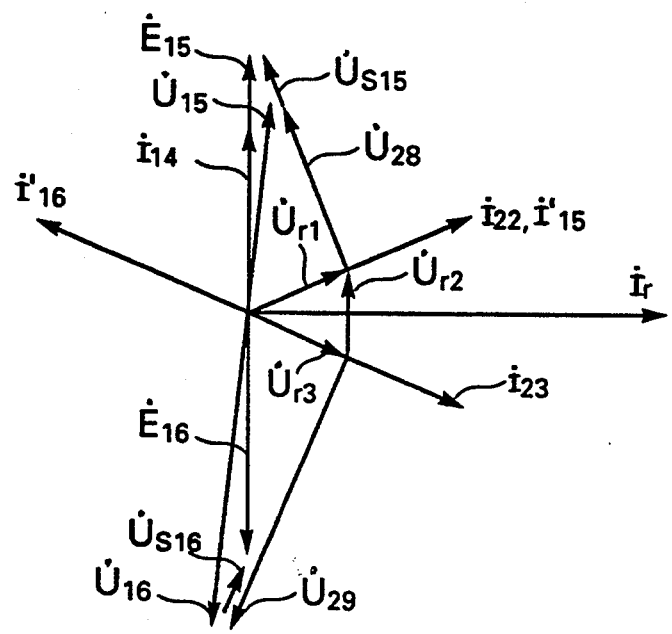
FIG. 23 is a vector diagram of operation of the single-phase power supply.

During the operation in mode 1, the first and second current loops are formed in the first half-wave while the fourth and fifth current loops are formed in the second half-wave. The third and sixth loops are practically absent. The currents and voltages in the circuit before the rectifier 17 in the first mode have approximately a sine form. Owing to this fact, here we can use the vector diagram, which is given for a low arc voltage (FIG. 23). The subscripts of the vectors of currents, voltages and e.m.f. in FIG. 23 corresponds to the reference numerals of the elements in FIG. 1. The voltages at the rectifier input are given as $U_{r1}$, $U_{r2}$ and $U_{r3}$. The voltage drop across the equivalent inductive reactance of the stray field of the winding 15 is referred to as $U_{s15}$ and that on the equivalent inductive reactance of stray field of the winding 16 is given as $U_{s16}$. The vector diagram (FIG. 23) is constructed relative to the point 27 of connection of the phase-shifting circuits 22 and 23. In this case, in the process of transfer from the secondary circuit of the transformer 13 to primary circuit the current and voltage vectors of one winding 16 reverse their direction while the current and voltage vectors of the other winding (15) do not change their direction. The secondary winding currents $I_{15}$ and $I_{16}$ related to the primary winding are given as $I'_{15}$ and $I'_{16}$. These currents are equal in magnitude and turned through the same angle in different directions relative to the e.m.f. vectors $E_{15}$ and $E_{16}$ of the secondary windings 15, 16. This attained, for example, due to the fact that the voltages of the secondary windings 15 and 16 are taken equal, while the reactances of the reactive elements (choke 28 and capacitor 29) in the phase-shifting circuits 22, 23 are selected from the condition $$x_2 = x_c + x_s, \qquad (1)$$

where
  $x_2$ is the inductive reactance of the choke 23,
  $x_c$ is the capacitive reactance of the capacitor 29;
  $x_s$ is the inductive reactance of stray field of the transformer 13.

The geometric sum of the currents $I'_{15}$ and $I'_{16}$ is the consumed current $I_{14}$ which is in phase with the supply voltage. In this way, the reactive components of the consumed current $I_{14}$ is compensated in the first operating mode. From the junction 27 of both phase-shifting circuit 22 and 23 flows a current $I_r$ which is a geometric sum of the currents $I_{22}$ and $I_{23}$ and in the first operating mode this current is much higher than current of the branches ($I_{22}$ or $I_{23}$).

A particular case of the operating mode 1 is a short-circuit mode. In this case the voltage at the output of the rectifier 17 is equal to zero, as well as at its input. This is equivalent to the case when both terminals of the choke 28 are connected to the winding 25 and both terminals of the capacitor 29 are connected to the winding 16 (the beginning and end of each phase-shifting circuit 22 and 23 short-circuited between each other). The voltages of the windings 15 and 16 of the transformer 13 are balanced by the voltage drops across the reactive elements (28 and 29) which limit the current. In this case, the currents in the circuits 22 and 23 are practically in phase relative to the junction of these branches. The sum of these currents, or the resultant current $I_r$ flows from this junction of the circuits 22 and 23 to the additional rectifiers 24 and 25, where it is rectified and then flows to the short-circuited electrodes 4, 5 of the furnace 1. Therefore, the short-circuit current of the furnace 1 is limited at a level of the sum of currents of both phase-shifting circuits 22 and 23. The same currents of the circuits 22 and 23 are summed up in the primary winding 14 almost in the opposite phase, and from the a-c mains there is consumed only a small current to cover the energy losses. Under the short-circuit circuit conditions, the choke 28 and the capacitor 29 form a parallel LC-circuit in which the energy exchange between the reactive elements (28, 29) is effected through the secondary windings 15, 16 of the transformer 13.

The inverter 2 in the mode III (FIG. 22) operates as follows:

During operation in the mode III a third current mode is in one half-wave and a sixth current loop in the second half-wave. There is no current from the junction 27 of the phase-shifting circuits 22 and 23 to the additional rectifiers 24 and 25. The choke 28 and the capacitor 29 are connected in series and their reactances are selected stemming from the condition (1) given above. Therefore, a series LC-circuit is formed, and the voltage drops on the reactive elements (28, 29) for the first harmonic are mutually compensated. The furnace 1 is fed through the rectifier 17 with an approximately arithmetic sum of voltages on the windings 15 and 16. In this operating mode the current is interrupted and appears in each half-way when the instantaneous voltage on the series-connected windings 15 and 16 is higher than the arc voltage. In this case, higher current harmonics and a certain inductive component arise. The proportion of higher harmonics is relatively low, because the LC-circuit suppresses some higher harmonics.

The effect of stabilization of the arc power in a nominal operating mode 85 (FIG. 22) manifests itself as follows:

On switching the current-limiting circuits 22 and 23 jointly with the secondary windings 15 and 16 of the transformer 13 from parallel to series connection and vice versa, the transformation ratio of the transformer 13 is changed. In the case of transfer from the mode III, in which the windings 15 and 16 are connected in series, to the short-circuit mode, in which these windings 15 and 16 are connected in parallel, the transformation ratio is almost twice as high.

In the mode II in each half-wave of the supply voltage the phase-shifting circuits 22 and 23 are changed over from parallel connection and back, and the ratio of existence of the parallel connection to the duration of existence of the series connection is varied continuously depending on the arc voltage. This is equivalent to a continuous variation of the transformation ratio of the transformer 13.

Under nominal operating conditions, which are defined by the maximum consumed alternating current $I_{14}$ (FIG. 22), the current $I_1$ of the furnace 1 will be somewhat higher than the current of one secondary winding 15 (16), the voltage of the furnace 1 is somewhat lower than the sum of voltages of both secondary windings 15 and 16, while the input power of the furnace 1 (taking into account of the active losses) is equal to 95–96% of the power of the transformer 13 in this operating mode. With a small deviation of the arc voltage from relative to the rated voltage $U_{dn}$, the consumed current $I_{14}$ (FIG. 22) changes insignificantly, as well as the power of the furnace 1. This is due to the fact that the arc voltage drop at the expense of a change of the transformation ratio results in such a rise of the arc current that the product of the current and voltage changes very little. The arc voltage fluctuation appearing in the process of operation cause no significant change of the power, and the furnace 1 has with practically stable maximum input power.

The power supply makes it possible to control the arc power.

If the arc voltage significantly drops down relative to the nominal voltage, the consumed alternating current $I_1$ (FIG. 22) and input power of the furnace 1 start decreasing. This allows one to control the arc power of the furnace 1 by varying the position of the electrode 4. For example, when the electrode 4 is lowered, the length and voltage of the arc are reduced and the inverter 2 responds to this action by setting new values of current and voltage. The product of the new values of current and voltage is lower than that of the old one so that the power is lower at the new set point. With such a control in a range of 100 to 60% of the nominal power 86 (FIG. 22) the efficiency remains practically the same. With further increase of the control range, the efficiency starts to decrease and subsequent control becomes unreasonable. The power factor remains to be high in the whole range of control, while the higher harmonics of the consumed alternating current first increase, approximately by 30% and then starts decreasing.

In the process of control the arc is shortened.

At the end of the control process the voltage will exceed the nominal value by a factor of 2 to 3, while the current will exceed the nominal value by 30–50%, i.e., a decrease in power is accompanied by an increase in the arc current. Therefore the arc length drops down not in proportion to the drop of power but at a higher rate. Thus, the power drop is accompanied by a transfer to a shorter arc. The operation with a short arc can be reasonable at some stage of the melting process to reduce the destructive effect of the arc on the lining of the furnace 1.

The degree of shortening the arc can be increased, if needed. This is attained by increasing the current-limiting circuits 22, 23, 34 of the inverter 2, as shown in FIG. 6. In a general case, both inductive circuits (34) and capacitive circuits can be added. The parameters of the circuits 22, 23, 34 are selected so that, in the first place, in the short-circuit mode the sum of the reactive power $Q_c$ of the capacitor 29 is equal to that of the reactive powers $Q_L$ of the chokes 28, 35 and inductances $Q_{SL}$ of the stray field of the transformer 13, i.e.

$$\Sigma Q_c = \Sigma Q_L + Q_{SL} \qquad (2)$$

In the second place, the total reactance of all series-connected phase-shifting circuits 22, 23, 34 must be close to zero. An increase of the amount of circuit causes no particular modifications in the operation of the power supply. However, an increase of these circuits results in an increase of the no-current voltage and/or the short-circuit current of the inverter 2. For example, for branches with the same voltage and reactance of the elements 28, 29, 35, the no-current voltage $U_{do}$ of the power supply is $$U_{do} = nU_{br} \qquad (3)$$

the short-circuit current of the power supply is $$I_{ds} = nI_{sbr} \qquad (4)$$

The resultant power $S_{br}$ of the phase-shifting circuits $$\Sigma S_{br} = nI_{sbr}U_{br} \qquad (5)$$

and the ratio $$U_{do}I_{ds}/\Sigma S_{br} = n \qquad (6)$$

where n is a number of the phase-shifting circuits 22, 23, 34

$U_{do}$ is the no-current voltage of the power supply,
$I_{ds}$ is the short-circuit current of the power supply,
$U_{br}$ is the nominal voltage of a single phase-shifting circuit 22 (or 23, or 24),
$I_{sbr}$ is the short-circuit current of single phase-shifting circuit 22 (or 23, or 34),
$S_{br}$ is the total power of a single phase-shifting circuit 22 (or 23, or 34).

From the expression (6) it is obvious that the product of the no-current voltage increases approximately in direct proportion to the number of circuits 22, 23, 34. This effect is explained by the fact that an increase of the secondary windings 15, 16, 33 of the transformer 13 increases the range of change of the transformation factor, and the windings are switched over from parallel connection to the series one.

The three-phase power supply having an ac-to-dc inverter with three phase-shifting circuits in one phase operates in a similar way (FIG. 14).

The principal operation of the inverter takes place in the second operating mode, when the current circuits are switched every half-wave four times. The switching of the current circuits causes stepwise voltage changes across the power supply elements and this, in turn distorts the sine shape of the current flowing through these elements. For this reason, the current consumed in the circuit is also non-sinusoidal, while the harmonics of this current under the nominal operating conditions amount to approximately 15–20%.

The voltage jumps distort the current the more, the lower the inductance in this current circuit. The least inductance have the second and fifth current circuits which extend through the capacitor 29.

Figure 7:
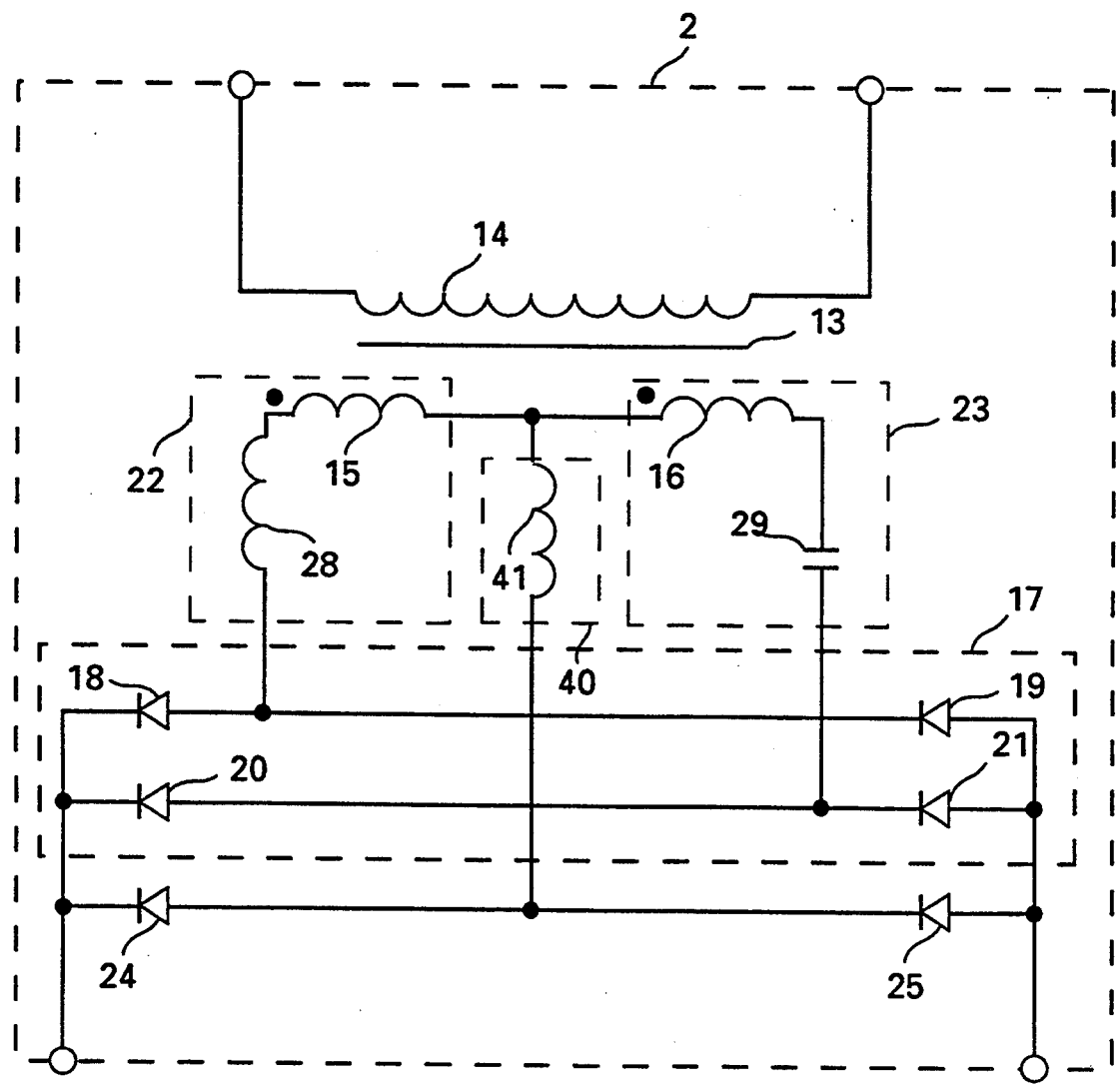
FIG. 7 is the same inverter having a current rise rate inhibition, according to the invention.
Figure 22:
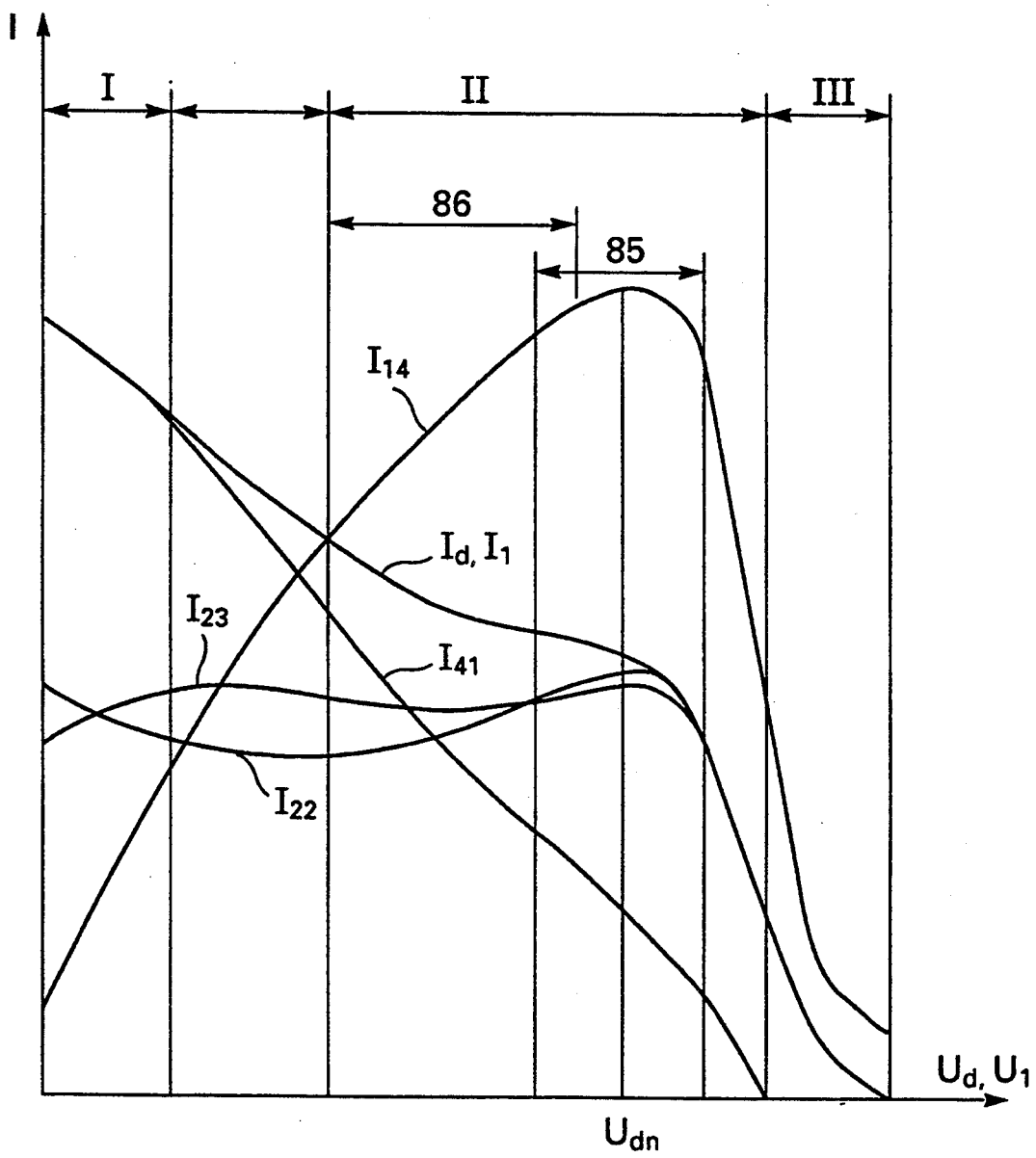
FIG. 22 is a diagram of distribution of the operating modes of the inverter depending on the voltage across the electrodes.
Figure 24:
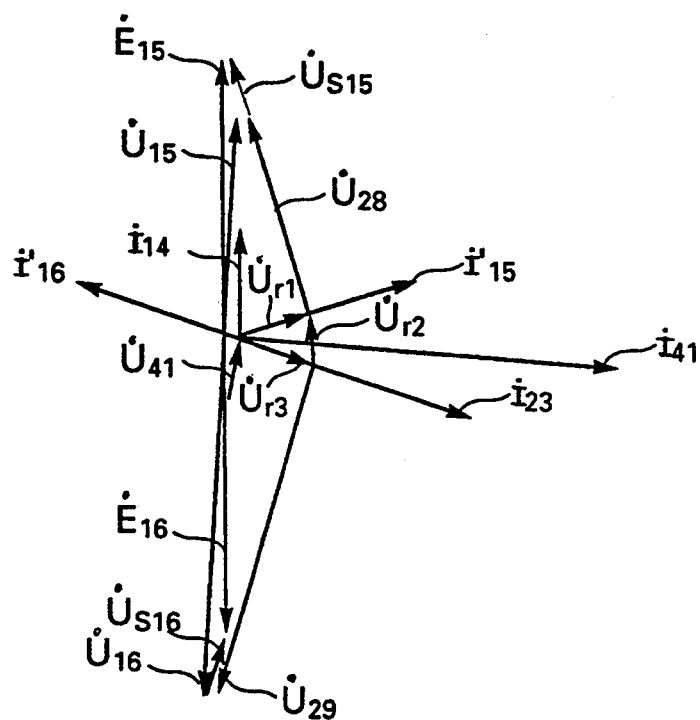
FIG. 24 is a vector diagram of operation of the single-phase power supply having a current rise rate inhibition circuit.

Therefore, the inverter 2 shown in FIG. 7 is provided with a current rise rate inhibition circuit made in the form of a choke 41, which is one of the elements of the formed second and fifth circuits increasing their total inductance making it possible to reduce the level of higher harmonics in the current consumed from the power network by a factor of two, In the first and second operating modes a voltage drop from the first harmonic current arises on the additional choke 41. The vector of this voltage $U_{41}$ (FIG. 24) has an approximately similar phase as the voltage on the winding 15 of the transformer 13. The voltage $U_{41}$ performs approximately the same action at the input of the rectifer 17 and the same voltage increase across the 16. Therefore, the use of an additional choke changes the ratio of the reactive powers on the reactive elements: chokes 28, 41 and capacitor 29. To preserve the compensation of the reactive component of the consumed current, the parameters of the transformer 13, chokes 28, 41 and capacitor 29 are selected so as to observe the balance of the reactive powers under the short-circuit conditions, i.e., the reactive power of the capacitor 29 is equal to the sum of the reactive powers of the chokes 28 and 41 and the stray fields of the transformer 13. This provides reactive power compensation. In the nominal operating mode the current through the additional choke is approximately twice as low as the current through the capacitor 29 and choke 28 (FIG. 22). Therefore, the connection of the additional choke 41 to the junction 27 of the circuit 23 comprising a capacitor 29, and the circuits 22 with a choke 28, to the electrodes 4, 5 of the furnace through additional rectifiers 24 and 25 is more preferable than connection of an additional choke in series with the capacitor 29 in the phase-shifting circuit 23.

Figure 8:
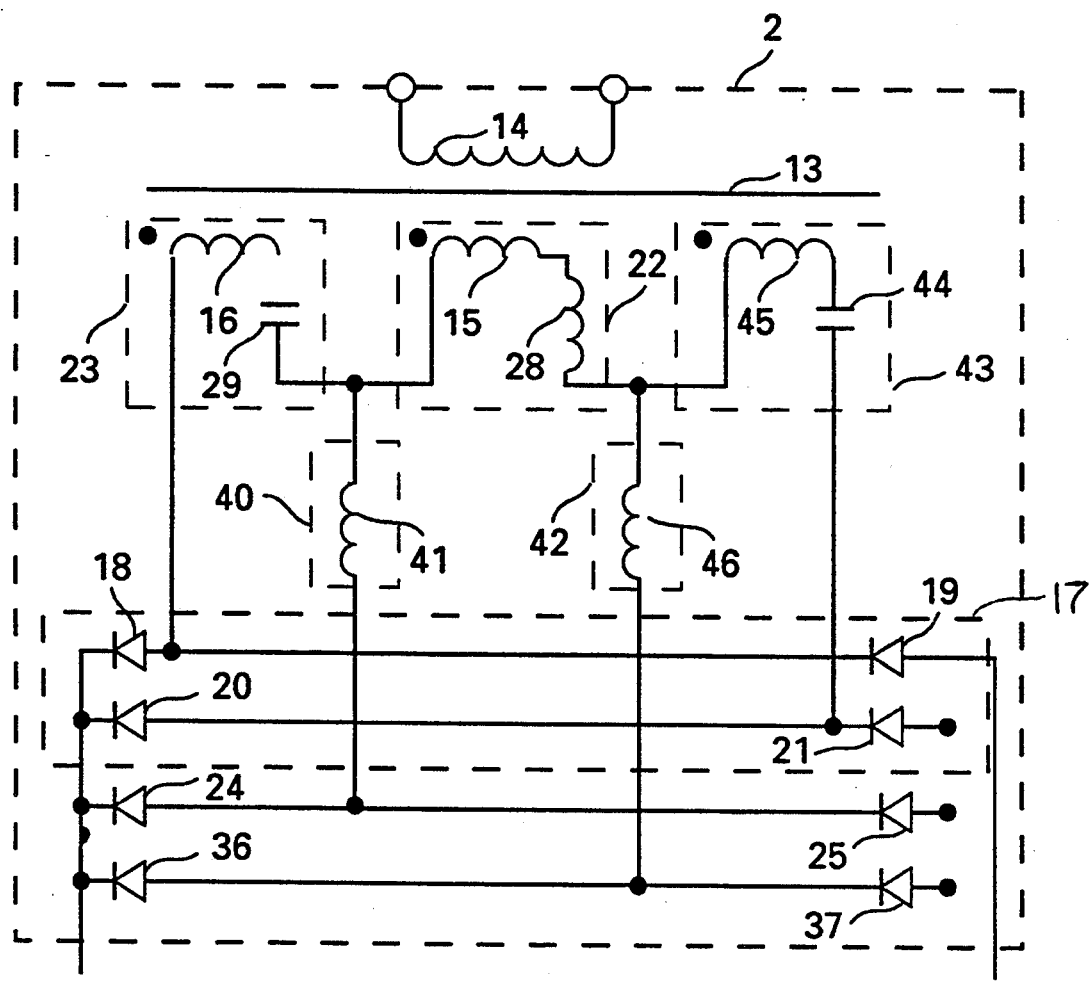
FIG. 8 is still another embodiment of the ac-to-dc voltage inverter having several current rise rate inhibition circuits, according to the invention.

The additional choke 41 is in the a-c circuit of the inverter 2 (FIGS. 7 and 8), or a choke 64 (65) is in the d-c circuit 2' (FIG. 14). The use of the additional choke 64 (65) in the d-c circuit of the inverter 2' provides a constructive advantage in three-phase power supplies, where it is possible to combine the chokes of all three phases in a single choke 64 or 65. However, the suppression of higher harmonics in a circuit with additional chokes 64, 65 in the circuits with the additional chokes 64, 65 in the a-c circuits is somewhat worse than in a similar embodiment with an additional choke 41 in the a-c circuits of the inverter 2 (FIGS. 7, 8).

Figure 15:
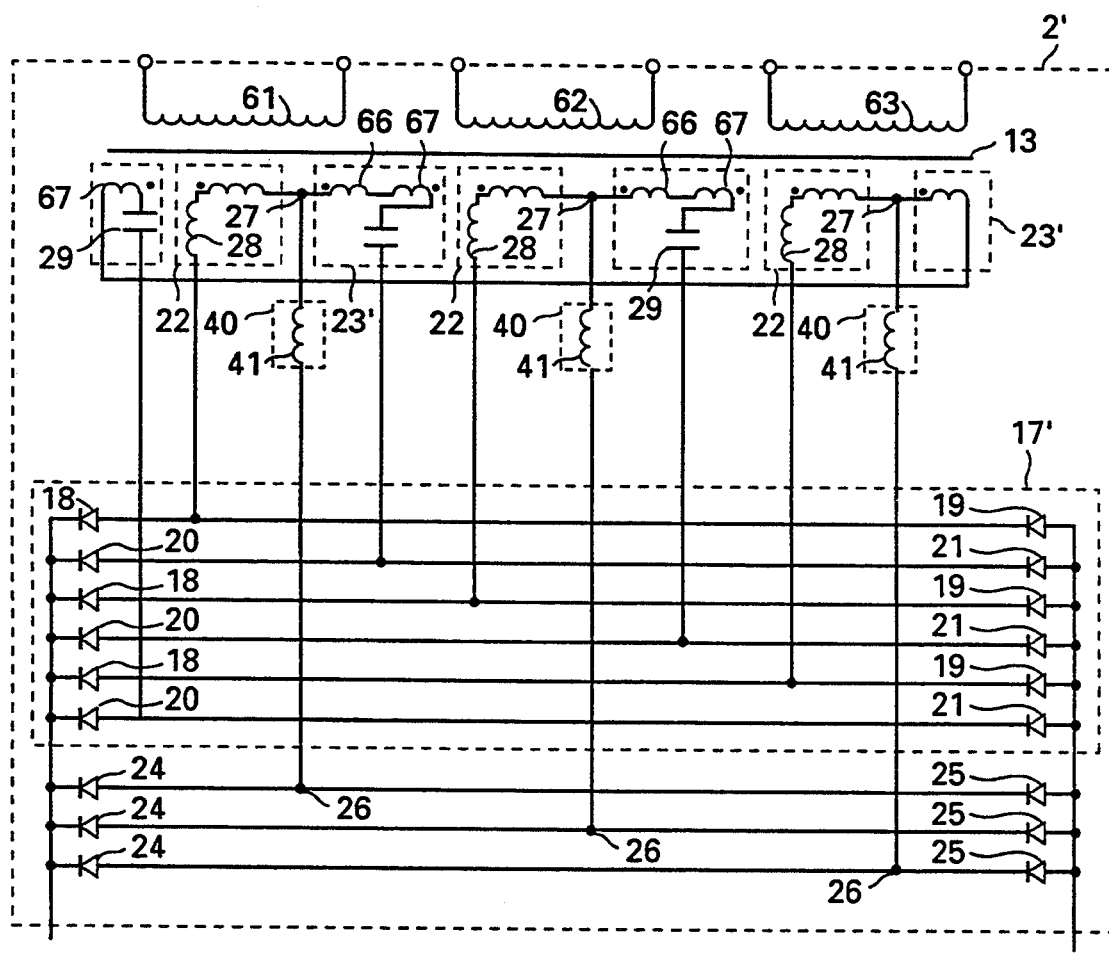
FIG. 15 shows the same inverter, according to the invention, in which the capacitive phase-shifting circuits have two windings for two individual phases of the transformer.

In addition to the known methods of increasing the number of phases, the level of higher harmonics in the three-phase power supplies can be reduced by using two windings 66 and 67 in the phase-shifting circuits 23, which are disposed in the different phases of the transformer 13 (FIGS. 14, 15). This action changes the phase of the supply voltage in the phase-shifting circuit 23 comprising a capacitor 29 relative to the supply voltage in the other phase-shifting circuits 22 by approximately 30%. In this case, each phase of the transformer 13 to supply the phase-shifting circuits 23, instead of one winding 16, has two windings 66, 67. The switching current jump through one phase-shifting circuit 23 is then distributed between the two phases of the transformer 13, and this reduces the amplitude of the higher harmonics in the current consumed from the power supply network.

Under the operating conditions of the furnace 1, when the total power of the power supply is not required, this power supply can be used for generating reactive power to the power supply network. To this end, the rectifiers 18 (FIG. 2a) and 19 in the phase-shifting circuit 23 comprising a choke 28 are made as controlled rectifiers, e.g., 18 and 19 thyristors). With no control pulses-on the thyristors, no current flows through the phase-shifting circuit 22, and the furnace is fed through the phase-shifting circuit 23. The capacitor 29 in this circuit 23 causes an advance phase shift of the current of the winding 16 of the transformer 13 relative to the voltage phase of this winding 16. In so doing, reactive power is supplied to the network through the winding 14 of the transformer 13, the maximum value of this power is equal to approximately 30% of the rated power of the source. By controlling the angle of opening the rectifiers 18 and 19, the controlled reactive power is continuously reduced practically to zero. In such a mode of reactive power generation depends also on the arc length in the furnace 1, and an increase of the arc length decreases the reactive power generation.

On the other hand, the reduction of the current through the phase-shifting circuit 22 decreases the active power fed to the furnace 1. Therefore, the generation of reactive power with maximum active power, i.e., in the nominal operating mode, is impossible.

The controlled rectifiers 18 and 19, in addition to the reactive power control, widens the range of continuous control of the active power. When the rectifiers 18 and 19 are rendered non-conductive and with an insignificant decrease of the control efficiency by controlling the electrode position, the active power is reduced to approximately 15-20% of the nominal value. In this case, the reactive power is always generated to the network.

In the three-phase power supply having one single-phase inverter 58–60 in each phase, these single-phase inverter 58–60 are connected in parallel at the d-c side. The output voltage of the parallel-connected single-phase inverter 58–60 is approximately the same as during the operation of these single-phase inverter 58–60 separately, while the output current is approximately three times the current of any inverter 58 (59, 60). The process of operation of the single-phase inverter 58–60 in the composition of this power supply slightly differs from the operation of these inverters 58–60 taken separately.

If the three-phase power supply has in each phase one single-phase inverter 58–60 with an additional choke 64, 65 in the d-c circuit, the voltage appearing on the chokes 64 and 65 is transmitted to the additional rectifiers 24 and 25 of all three phases. Therefore, a change in the current flowing through the additional rectifiers 24 (or 25) in one phase changes the switching conditions of the additional rectifiers 24 (or 25) in the remaining phases. This results in some distinctions in the operation of the single-phase inverters 58–60 in the composition of the three-phase power supply compared to the operation of these single-phase inverters 2 (FIG. 1) taken separately. In particular, the additional chokes 64 and 65 practically have no effect on the balance of the reactive powers in the short-circuit operating mode.

If in the three-phase power supply with an inverter 2' (FIG. 11), formally having one single-phase inverter 58–60 in each phase, the series circuits of the phase-shifting circuits 22, 23 of the inverters 58–60 of different phase are connected in delta (FIGS. 16, 17) or in star (FIG. 18) or in a "slip delta" circuit (FIG. 19), there is no voltage on the reactive elements of the circuits 22, 23, for example, in the no-current operating mode. The no-load voltage of the inverter 2' will be the same as in the absence of reactive elements in the circuit, i.e., it corresponds to the delta connection of the windings 15, 16 of the transformer 13, or in star, or in "slip delta". In the short-circuit mode the beginning and end of each phase-shifting circuits 22, 23 of any phase are bridged through the rectifier 17 and short-circuited electrodes 4, 5 of the furnace 1. Therefore, the conditions of compensation of the reactive power in the short-circuit mode will practically be the same as in the absence of a connection between the phase-shifting circuits 22, 23 of different phases. However, the current through the short-circuit electrodes 4, 5 of the furnace 1 will be lower than the sum of currents of the phase-shifting circuits 22, 23. This is due to the fact that at the points 68, 69, 70 (FIG. 16) or 74 (FIG. 18), or 27 (FIG. 19) the connections of the phase-shifting circuits 22, 23 of different phases only a portion of the current of the circuit 22 (23) passes through the rectifiers 18–21 and electrodes 4, 5 of the furnace 1, while the other portion of this current flows directly through the phase-shifting circuit 22 (23). It is clearly seen in the delta circuit (FIG. 16), where the short-circuit current of the furnace is greater than the nominal current by 20–30% only.

Figure 17:
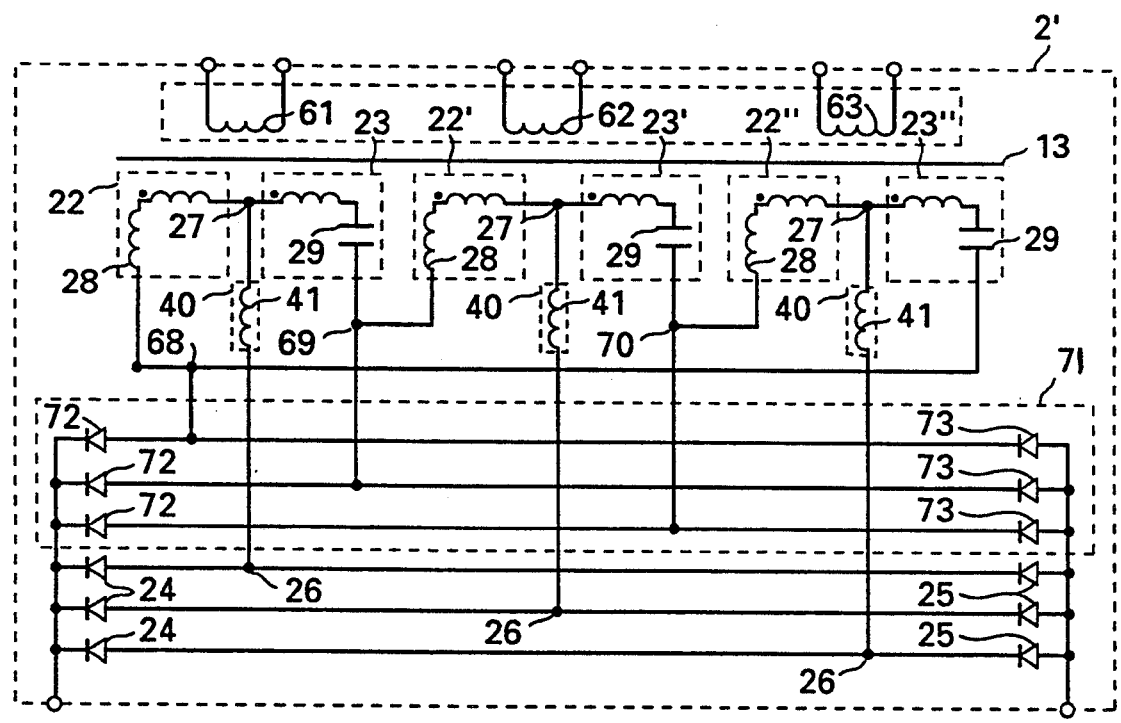
FIG. 17 is a schematic diagram of the same inverter having delta-connected phase-shifting circuits and current rise rate inhibition circuits, according to the invention.

Under the nominal operating conditions and in the power control range currents also flow from one phase of the inverter to the other through the junction 68, 69, 70 (FIG. 16 ) or 74 (FIG. 18), or 27 (FIG. 19 ) of the circuits 22, 23 of different phases. The magnitude of these interphase currents depends, in particular, on the phase shift of the current in the junctions of the circuits 22, 23. These angles of phase shift depend on a specific connection diagram of the circuits and, in accordance with the connection shown in FIGS. 16, 17, 18 and 19 these angles are different. When a phase-shifting circuit 22 of one phase comprising a capacitor 29 is connected to that of the other phase (FIGS. 16, 17 and FIG. 19), the phase shift between the currents of these circuits 22, 23 varies depending on the load, i.e. on the arc length in the furnace 1. It will be noted that in ordinary three-phase transformers the phase shift between the currents in the windings 15, 16 of different phases of the transformer 13 is practically constant at any load. The difference in the interphase connections will results in that the output characteristics of the power supply with inverters according to FIGS. 16, 18 and 19 differ both from each other and from those of the power supply characterized by parallel operation of inverters 58–60 of all phases. The output characteristic of the power supply shown in FIGS. 16, 17 is also dependent on the succession of the phases of the three-phase supply voltage. A change in the phase succession changes the nominal power more than by a factor of two and the nominal voltage almost by a factor of two. Such an effect makes it possible to obtain one control stage in a simple way.

This effect stems from the fact that the change of the succession of phases changes the conditions of summing-up of the constant phase shift of a three-phase power supply system (120°) and the variable phase shift from the voltage of the reactive elements. If the phase-shifting circuit 23 with a capacitor 29 is in the first phase and the associated phase-shifting circuit 22 with a choke 28 in the second phase, the variable phase shift of the reactive elements (28, 29) reduces the constant phase shift of the three-phase power supply. This decreases the interphase current and increases the current through the rectifiers 72, 73 in the furnace 1. If, on the contrary, the phase-shifting circuit 22 with a choke 28 is in the first phase and the associated phase-shifting circuit 23 with a capacitor 29 is in the second phase, the variable phase shift increases the constant phase shift. This action increases the interphase current, because with the total shift of 180° this current is maximum, and the current through the rectifiers 72, 73.

For more powerful sources it is often difficult to realize the elements for high currents and powers, e.g., a number of capacitors directly connected in parallel is limited for safety reasons, no rectifiers for very high currents are available, etc.

In such cases the power supply is assembled from comparatively low-power units operating in parallel. These units comprise reactive elements (capacitors and chokes) as shown in FIGS. 8 and 9 illustrating a decrease of the number of capacitors directly connected of the rectifiers, reactors and capacitor batteries.

The inverter 2 assembled of relatively low-power elements connected in parallel (FIGS. 9, 10) will cause no essential distinctions in the power supply operation. The currents between individual capacitor batteries 29, 47 are distributed in proportion to the capacitance of these batteries, while the currents between the individual chokes 28, 51 are distributed in inverse proportion to the inductance of these chokes.

In some cases, for example for electric-arc welding, the power supply voltage must be lower than 100 V. The capacitor 29, which in this power supply is in the secondary circuit of the matching transformer 13 is under low voltage. The capacitance of this capacitor 29 depends in inverse proportion on the voltage square. Therefore, the low voltage results in an increase of the capacitance, size and cost of the capacitor 29. This can be avoided if the capacitor 29 is inserted in the circuit of the primary winding 14 of the matching transformer 13 according to the circuit shown in FIG. 3 or FIG. 4. In this case, the operating voltage of the capacitor 29 is approximately equal to the supply voltage, while in the second case it is approximately twice this voltage.

Figure 5:
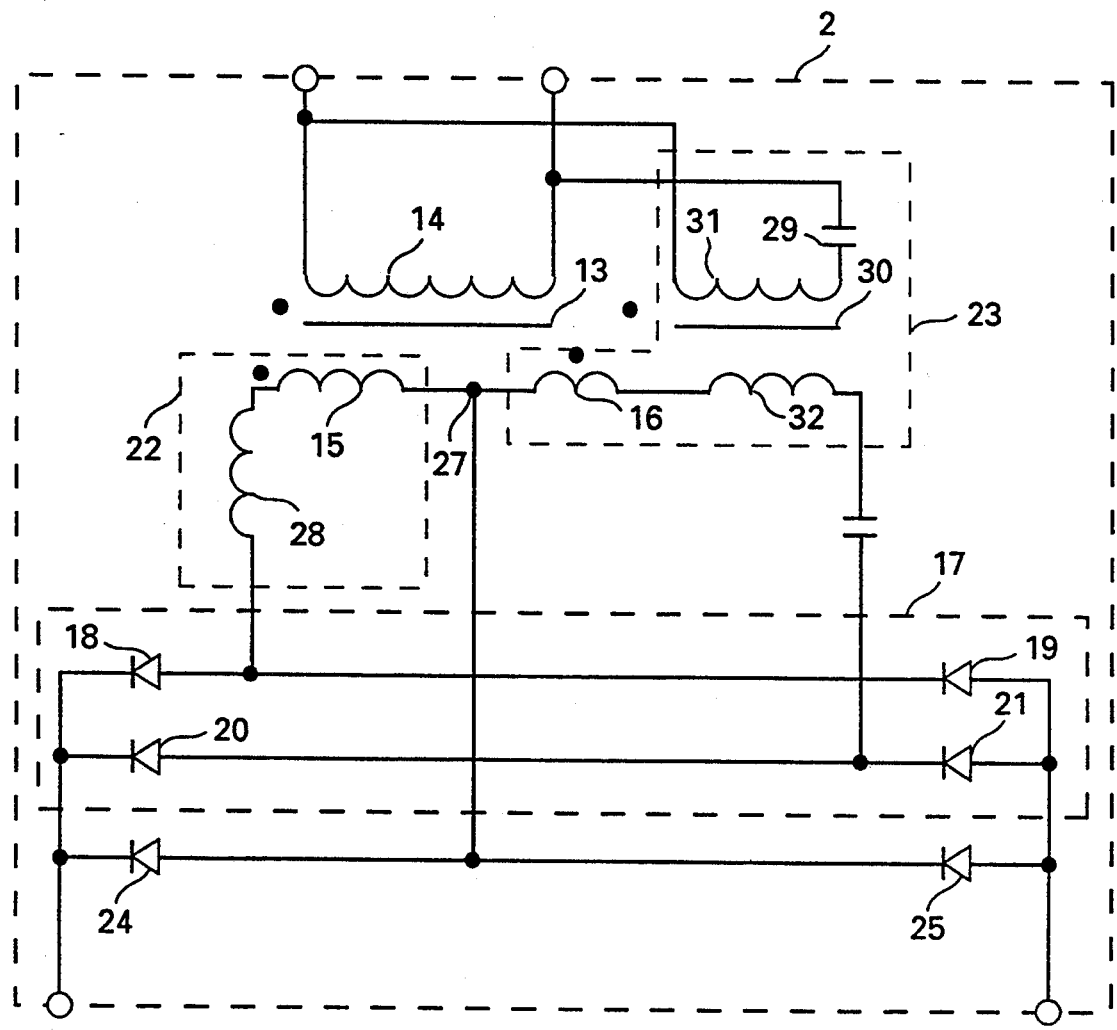
FIG. 5 shows the same inverter, in which the capacitive phase-shifting circuit with windings on individual transformers, according to the invention.

The embodiments of the power supplies with inverters shown in FIGS. 3, 4, 5, where the capacitor 29 or choke 28 are in the primary winding of the transformers 13 and 30, have almost the same output characteristics as the embodiments with the capacitor 29 and choke 28 in the secondary circuits of the transformer 13 (FIGS. 1, 2). Due to this fact, practically no current flows between the electrodes 4 and 5 in the electric-arc operating mode. The distinction between these embodiments are practically absent also in the process of operation of the rectifiers 17 and additional rectifiers 24, 25. The transformer 30 (FIG. 3) and a capacitor 29 in the primary winding 31, and this fact causes a change of voltage on the winding 31 when a current flows through the capacitor 29. In the no-load mode a low current for magnetizing the transformer 30 flows through the capacitor 29 and this results in an increase of the voltage on the winding 31 above the network voltage. In the short-circuit mode of the power supply the voltages on both windings of the transformer 30 are close to zero. Therefore, the voltage on the transformer 30 and the induction in its magnetic circuit varies depending on the arc current in a range from zero to the rated value.

The operation of the embodiment of the power supply shown in FIG. 5, where the phase-shifting circuit 23 comprises the secondary winding 32 of the transformer 30 and the primary winding 16 of the transformer 10 connected in series and in the same polarity differs from the embodiment according to FIG. 3, essentially, in that in the short-circuit mode the winding 32 of the transformer 30 is connected through the rectifier 17, additional rectifiers 24, 25 and the short-circuited electrodes 4, 5 in parallel to the winding 16 of the transformer 13. In so doing, the winding 32 in the transformer 30 will play a role of a primary winding while the winding 31 plays a role of a secondary winding. In this case, the phase on the winding 31 differs approximately by 180° from the network voltage phase. Applied on the capacitor 29 is approximately a sum of voltages of the winding 31 and power supply voltage. A change of the arc voltage leads to a change in the voltage amplitude on the transformer 30 within relatively small limits, while the phase of this voltage changes approximately for 180°.

The d-c component of the voltage on the capacitor 29, appearing due to drastic drops of the current of the arc between the electrodes 4, 5 in the inverters shown in FIGS. 3, 4, 5 causes saturation of the magnetic circuit of the transformer 30 and appearance of ferromagnetic oscillations between the capacitor 29 and the transformer 30. To prevent this undesirable phenomenon, the capacitor 29 and/or winding 32 of the transformer 30 must be provided in parallel with circuits which, as the arc current drastically drops down, provides discharge of the capacitor 29 and extinguishing the energy of the charge accumulated in the electric field of this capacitor. Such a circuit, for example, may consist of a saturation reactor and a resistor connected in series, or of a controller rectifier and a resistor connected in series.

The insertion of the choke 28 in the primary circuit of the transformer 13 (FIG. 4) results in a change in voltage on the transformer 13 in a range of approximately from zero to the network voltage but there is no danger of ferroresonance.

As mentioned above, the controlled power supply under discussion makes it possible to reduce the level of higher harmonics in the current consumed from the network by rather simple means. This reduces the negative effect of the power supply on power network.

The decrease of higher harmonics in the consumed current is attained, first, due to the fact that the power supply has no elements with phase control, e.g., a controlled reactor or thyristors. It is well known that with phase control there is no network current at the beginning of the half-wave, while at some instant, e.g., in the middle of the half-period the reactor core steel is saturated with control current, or a control pulse is sent to the thyristor, and the network current sharply increases to a value determined by the load resistance.

Thus, the current sine wave is distorted. The proposed power supply has no such distortions due to the absence of controlled elements. On the other hand, the distortion of a sine wave arises also in an uncontrolled rectifier bridge circuit, in which a natural process of rendering some rectifiers conductive and the others—non-conductive associated with switching of the current loops. The switching process changes the voltage on the circuit elements stepwise, and the sinusoidal form of the current flowing through these elements is distorted. The voltage jumps distort the current the higher, the lower is the inductance of this current circuit, The current loops extending through the capacitor battery and the tap of the secondary winding of the transformer feature the least inductance. An additional choke in the tap circuit of the transformer makes it possible to increase the inductance of these loops, thereby reducing the level of higher harmonics in the consumed current. The obtainable level of higher harmonics in the consumed current under all operating conditions does not exceed 6–8% of the nominal current without increasing the number of inverter phases and for 2–3% with an increase of the number of phases of the inverter to twelve, whereas the level of harmonics in the thyristor rectifier is 20–25% and 10–15%, respectively.

The reduction of the voltage deviation in the network and a low level of higher harmonics allow the proposed power supply to operate without an expensive dynamic compensator and filters in the network, where the network short-circuit power is only 12–15 times the supply source power. A decrease of the required short-circuit power by a factor of 3 to 4 significantly increases the amount of those networks, where the dynamic compensation is not needed. The cost of a prior art power supply with a dynamic compensator will be approximately by 50–60% higher than without this compensator. When the proposed power supply is used instead of the prior art thyristor supply with a dynamic compensator, the equipment cost is decreased by a factor of 2.2.

The decrease of the negative effect on the network is also expressed in a decrease of the voltage fluctuation due to the mutual compensation of the reactive components of the currents of the capacitor battery and reactors, the reactive component of the consumed current of the proposed power supply in the whole operating range from the no-load current to the short-circuit current is relatively low. The maximum value of the reactive component is equal to 20–40% of the active component of the nominal mode. In the prior art rectifier in the short-circuit region the reactive component is practically equal to the total current and amounts to 100–120% of the active component of the nominal mode. Therefore, the voltage fluctuation in the proposed power supply are reduced by a factor of 3 to 4.

The proposed power supply has higher efficiency than the prior art thyristor power supply. The efficiency is increased at the expense of reducing the power losses in the transformer and reactors, and also due to replacement of the thyristors by diodes.

The transformer efficiency in the prior art power supply is approximately equal to that of the proposed. On the other hand, in the proposed supply both the transformer power and losses are twice as low.

Due to the high installed power of the reactors in the proposed power supply, the total loss of power in these reactors is lower by the same factor.

In the prior art power supply the load current passes through two series-connected thyristors of the rectifier bridge, while the proposed prior art power supply this current flows through two series-connected diodes. Since the voltage drop across a thyristor is approximately twice as high as across a diode, the power losses in the thyristor rectifier bridge is also approximately twice as high as in the diode bridge.

As a result, the losses in the proposed prior art power supply sum up approximately 60% of the losses in the prior art supply. The efficiency of the proposed power supply with a power of 70 MW is approximately 0.98, which is by 1.5–2% higher than in the prior art thyristor power supply.

The proposed prior art power supply is characterized by high stability of the arc, because the no-load voltage exceeds the nominal voltage for 30–40%. This is 1.5–2 times higher than in the prior art thyristor power supply. A higher voltage reserve reduces the number of arc breaks.

Furthermore, the proposed power supply allows one to continuously control the input power of the furnace in a range of 65–100% of the nominal power without controlled rectifiers or stepwise switching. In so doing, the control practically does not deteriorate the power factor, rises no level of higher harmonics and does not reduce the efficiency.

When the proposed power supply is equipped with controlled rectifiers, the lower limit of stepless power control is reduced to 15–20% of the nominal. In this case, the control is not connected with consumption of reactive power from the network but, on the contrary, reactive power is generated to the network. The increase of higher harmonics and decrease of the efficiency during the power regulation will be much less than in the prior art supply.

In the case of a three-phase power supply having delta-connected phase-shifting circuits one can obtain one step of power regulation by changing the succession of the supply voltage phases.

In the second operating mode the inverter operates as follows:

In the second mode each half-wave is divided in four intervals with different current loops: in the first interval there are formed the second and first or fifth and sixth loops; in the second interval there are formed the second and third or fifth and sixth loops; in the third interval there are formed the third and sixth loops; in the fourth interval there are formed the third and fourth or sixth and first loops for the first or second half-wave, respectively. The first interval is obtained when the power supply voltage passes through zero. With such an order of succession of current loops in one half-wave of the power supply voltage the phase-shifting circuits 22 and 23 are switched from parallel connection to the series one vice versa. In so doing, parallel connection exists in the region of transition of the supply voltage through zero while the series connection exists in the region of maximum of this voltage.

The capacitor 29 and choke 28 included into the circuits 22 and 23 are also switched from parallel connection to the series one and back. In both versions of connection the reactive powers on the capacitor 29 and choke 28 are mutually compensated. Therefore, in the second operating mode, also, the reactive component in the consumed alternating current is relatively low.

We claim:

1. A controlled power supply for technological needs and using an electric arc, comprising: a single phase ac-to-dc invertor having a matching transformer and a main rectifier including diodes forming a bridge and connected to said matching transformer; said invertor having a controllable output; said bridge having a diagonal comprising an output of said rectifier and electrodes between which an electric arc can be initiated; a circuit for controlling the voltage across said electrodes and having a comparator to compare an actual rectified voltage with a reference value; means with input connected to said comparator for changing positions of said electrodes relative to each other; said single-phase ac-to-dc invertor having two phase-shifting circuits connected in series at a first junction and to said matching transformer; the first one of said phase-shifting circuits comprising a choke; the second one of said phase-shifting circuits comprising a capacitor; each phase-shifting circuit being connected to a corresponding input of said main rectifier; additional rectifiers having a second junction connected to said first junction; said phase-shifting circuits being connected to an output of said main rectifier in the same polarity with diodes of said main rectifier connected to said electrodes.

2. A controlled power supply as defined in claim 1, wherein two of said diodes are connected to said first phase-shifting circuit and comprise controlled rectifiers.

3. A controlled power supply as defined in claim 1, wherein said matching transformer has two secondary windings; the first one of said secondary windings and said choke forming said first phase-shifting circuit; the second one of said secondary windings and said capacitor forming said second phase-shifting circuit, said second secondary winding being connected to said first secondary winding and said capacitor.

4. A controlled power supply as defined in claim 1, wherein said matching transformer is a first matching transformer; said invertor having second matching transformer with a secondary winding connected in series with said first phase-shifting circuit and switched in accordance with a secondary winding of said first matching transformer; said first phase-shifting circuit including said secondary winding and said choke, said second matching transformer having a primary winding connected in series with said capacitor; said second phase-shifting circuit including said second matching transformer and said capacitor.

5. A controlled power supply as defined in claim 1, wherein said matching transformer is a first matching transformer with a first secondary winding and a second secondary winding; said invertor having a second matching transformer with a primary winding and a secondary winding connected in series with said secondary winding of said first matching transformer; said first phase-shifting circuit including said first secondary winding of said first matching transformer and said choke; said second phase-shifting circuit including said second secondary winding of said first matching transformer, said second matching transformer and said capacitor, said capacitor being connected in series with said primary winding of said second matching transformer.

6. A controlled power supply as defined in claim 1, wherein said matching transformer is a first matching transformer with a first secondary winding and a second secondary winding; said invertor having a second matching transformer with a primary winding and a secondary winding connected in series with said second secondary winding of said first matching transformer; said first phase-shifting circuit including said first matching transformer and said choke, said choke being connected in series with a primary winding of said first matching transformer; said second phase-shifting circuit including said second matching transformer and said capacitor, said capacitor being connected in series with said primary winding of said second matching transformer.

7. A controlled power supply as defined in claim 3, wherein said matching transformer has at least one additional secondary winding; said invertor comprising an additional number of phase-shifting circuits corresponding to the number of additional secondary windings of said matching transformer, each phase-shifting circuit including a corresponding secondary winding of said matching transformer and said choke or said capacitor; further rectifiers connected in the same polarity to all said additional rectifiers, each additional phase-shifting circuit corresponding to one pair of said further rectifiers.

8. A controlled power supply as defined in claim 1, including a current rise rate inhibition circuit for connecting said second junction of said additional rectifiers to said first junction of said phase-shifting circuit.

9. A controlled power supply as defined in claim 8, wherein said current rise rate inhibition circuit comprises a choke.

10. A controlled power supply as defined in claim 1, wherein said second phase-shifting circuit has at least one capacitor with one terminal connected to said main rectifier; said second phase-shifting circuit having two rectifiers connected at a third junction and connected to the output of said main rectifier in the same polarity with said diodes, remaining terminals of all capacitors being connected together; said second phase-shifting circuit being connected to said main rectifier through said one terminal of said capacitor and through said two rectifiers of said second phase-shifting circuit.

11. A controlled power supply as defined in claim 1, wherein each phase has at least one single-phase ac-to-dc invertor, all single-phase invertors being switched in parallel at a dc side and connected to said electrodes.

12. A controlled power supply as defined in claim 11, including an additional choke inserted between each of said electrodes and a corresponding output of said additional rectifiers of the single-phase invertor of each phase.

13. A controlled power supply as defined in claim 11, wherein the phase-shifting circuit with said capacitors in said ac-to-dc invertor of each phase comprises two windings arranged in different phases of said matching transformer and connected in series with one another and with said capacitor of the corresponding phase-shifting circuit.

14. A controlled power supply as defined in claim 11, wherein the series-connected phase-shifting circuits of all phases are connected in delta, all pairs of rectifiers in said main rectifier being connected in parallel and comprising rectifiers of different phases and combined in one rectifier.

15. A controlled power supply as defined in claim 11, wherein the series-connected phase-shifting circuits of all phases are connected in a star, all groups of parallel-connected rectifiers in said main rectifier comprising rectifiers of all phases and combined in one rectifier.

16. A controlled power supply as defined in claim 11, wherein the series-connected phase-shifting circuits of all phases are connected in a slip delta circuit; all pairs of rectifiers being connected in parallel and comprising diodes of a further rectifier and being combined with said additional rectifier of the adjacent phase in another one rectifier.

* * * * *